US007472282B1

(12) United States Patent
Fujii et al.

(10) Patent No.: US 7,472,282 B1
(45) Date of Patent: Dec. 30, 2008

(54) ILLEGAL ACCESS DISCRIMINATING APPARATUS AND METHOD

(75) Inventors: Yusaku Fujii, Kawasaki (JP); Takashi Shinzaki, Kawasaki (JP)

(73) Assignee: Fujitsu, Ltd., Kawasaki (JP)

( * ) Notice: Subject to any disclaimer, the term of this patent is extended or adjusted under 35 U.S.C. 154(b) by 673 days.

(21) Appl. No.: 09/425,736

(22) Filed: Oct. 22, 1999

(30) Foreign Application Priority Data

Oct. 23, 1998 (JP) .................................. 10-302008

(51) Int. Cl.
*H04K 1/00* (2006.01)
*H04L 9/00* (2006.01)
(52) U.S. Cl. .................................................... 713/186
(58) Field of Classification Search ................. 380/229, 380/232, 238, 258; 713/152, 166, 168, 169, 713/176, 186, 201; 726/27
See application file for complete search history.

(56) References Cited

U.S. PATENT DOCUMENTS

| 5,229,764 | A | * | 7/1993 | Matchett et al. ............. 340/5.52 |
| 5,276,444 | A | * | 1/1994 | McNair ....................... 340/5.8 |
| 5,715,518 | A | * | 2/1998 | Barrere et al. ................ 340/5.8 |
| 5,892,838 | A | * | 4/1999 | Brady ......................... 382/115 |
| 6,035,403 | A | * | 3/2000 | Subbiah et al. .............. 713/201 |
| 6,035,406 | A | * | 3/2000 | Moussa et al. ................ 726/18 |
| 6,311,272 | B1 | * | 10/2001 | Gressel ....................... 713/186 |
| 6,581,042 | B2 | * | 6/2003 | Pare, Jr. et al. ................ 705/40 |

FOREIGN PATENT DOCUMENTS

| JP | 06-282527 | 10/1994 |
| JP | 08-249253 | 9/1996 |
| JP | 10-222469 | 8/1998 |
| JP | 10-269183 | 10/1998 |
| WO | 97/31317 | 8/1997 |

OTHER PUBLICATIONS

Official Actions from the Japanese Patent Office for Application No. JP10-302008 including Appeal Decision issued Apr. 1, 2008, Questioning issued Oct. 23, 2007, Decision of Refusal issued Aug. 30, 2005 and Notification of Reasons for Refusal issued Mar. 15, 2005 (with English translations).

* cited by examiner

*Primary Examiner*—Emmanuel L Moise
*Assistant Examiner*—Nadia Khoshnoodi
(74) *Attorney, Agent, or Firm*—Westerman, Hattori, Daniels & Adrian, LLP.

(57) ABSTRACT

ID information and organic information based on authentication demand which a service providing system received from a user terminal are inputted and stored into a use information storing unit. The ID information and organic information stored in an organic information input storing unit and an ID information input storing unit and the ID information and organic information which were inputted in the past in the use information storing unit are compared and collated by a comparing unit and a collating unit. A control unit discriminates an authentication demand by an illegal access person on the basis of results of the comparison and collation, notifies the service providing system of a discrimination result, and logs identity information of the illegal access person.

20 Claims, 22 Drawing Sheets

FIG. 2

| | ID INFORMATION | ORGANIC INFORMATION |
|---|---|---|
| 0000 | ID01 | LB01 |
| 0001 | ID05 | LB05 |
| | ⋮ | ⋮ |
| | ID74 | LB74 |
| | ⋮ | ⋮ |
| FFFF | | |

22-1 — ID INFORMATION
22-2 — ORGANIC INFORMATION
22

F I G. 5
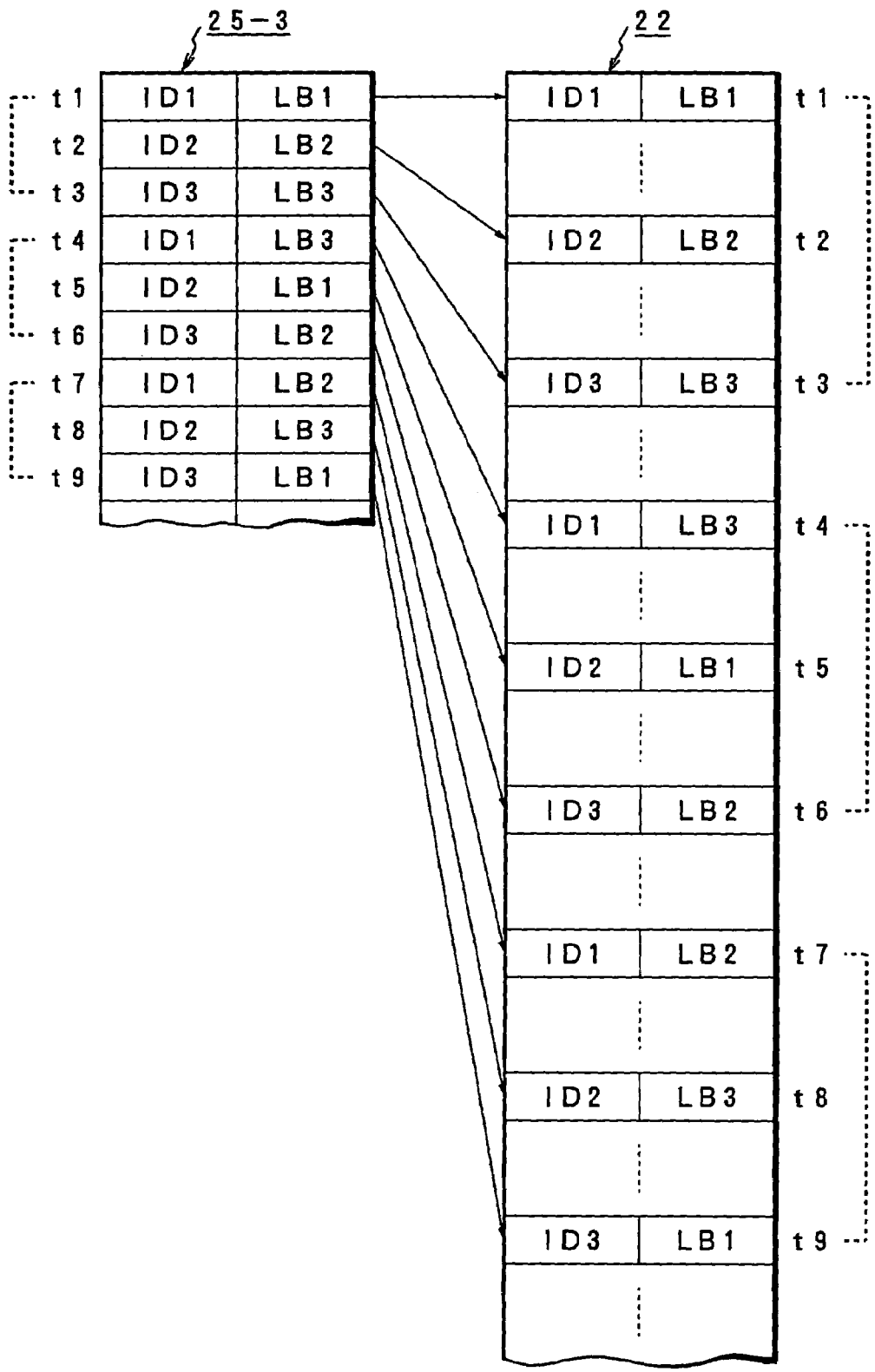

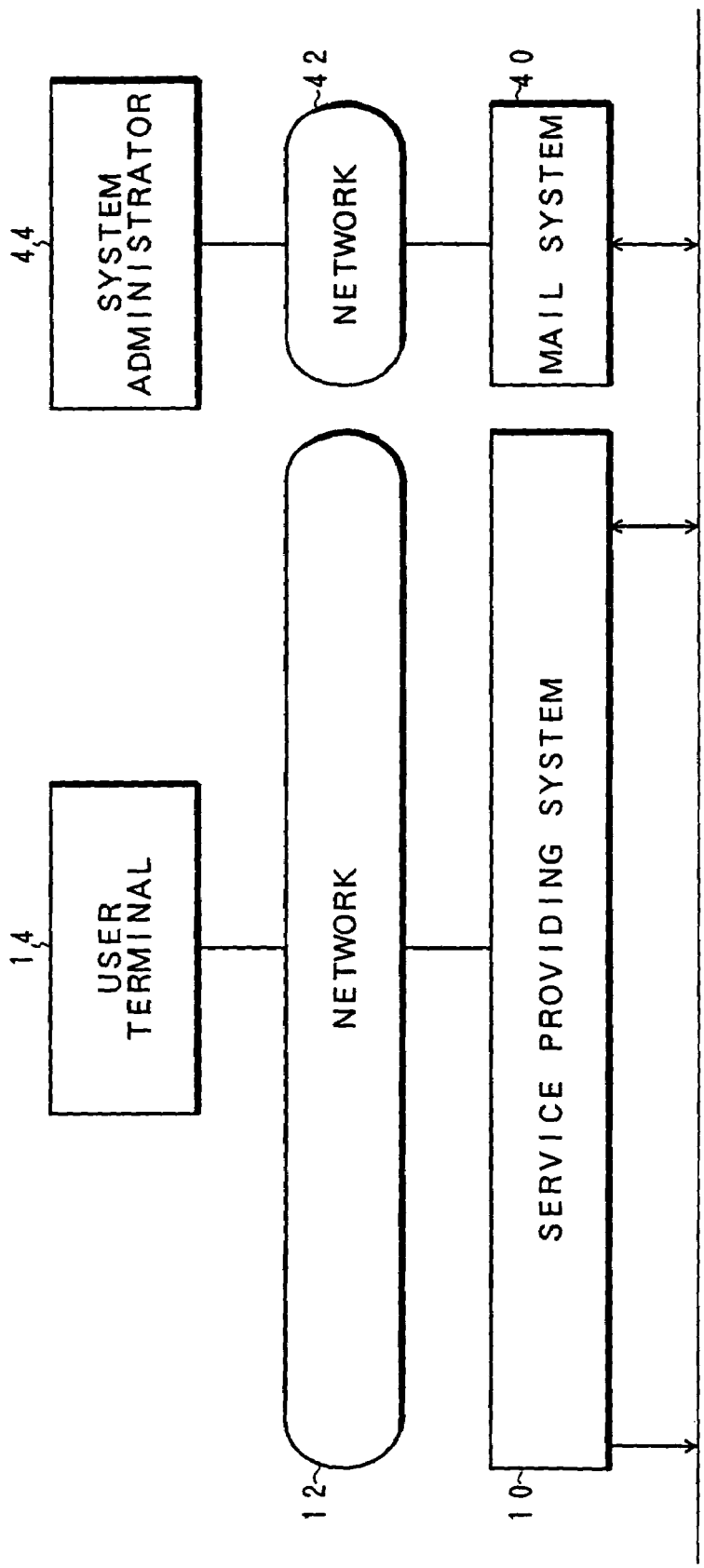

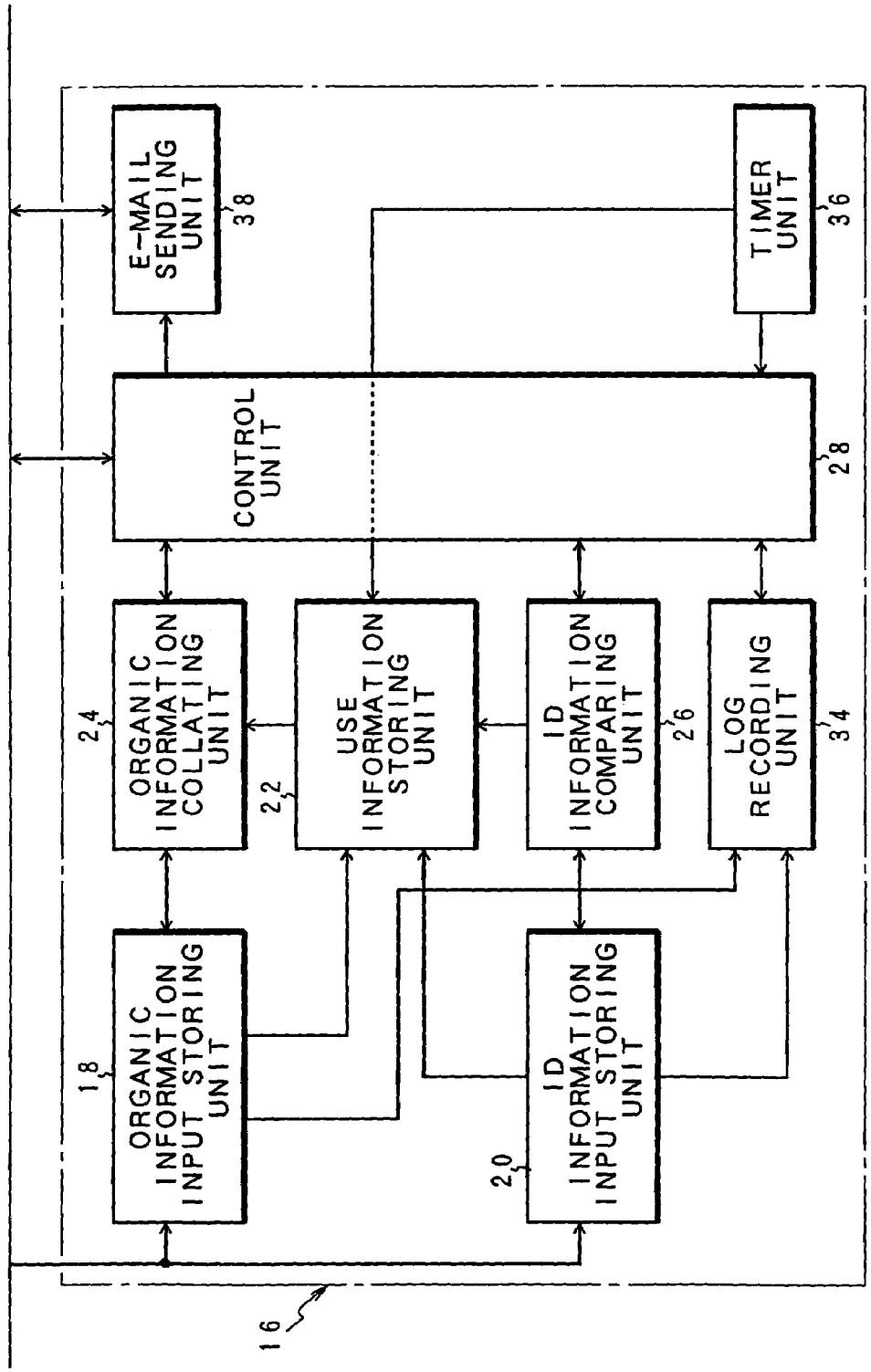

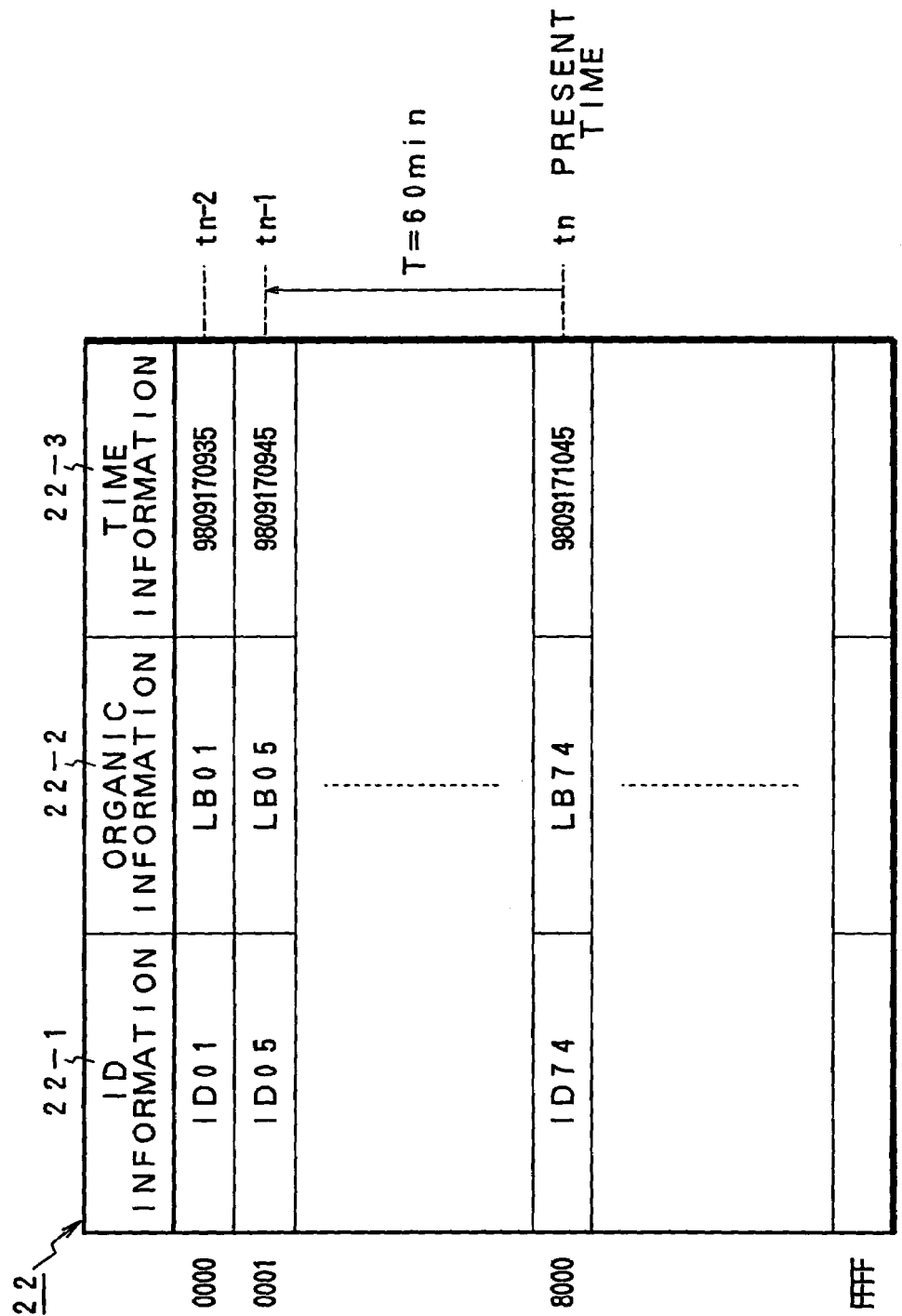

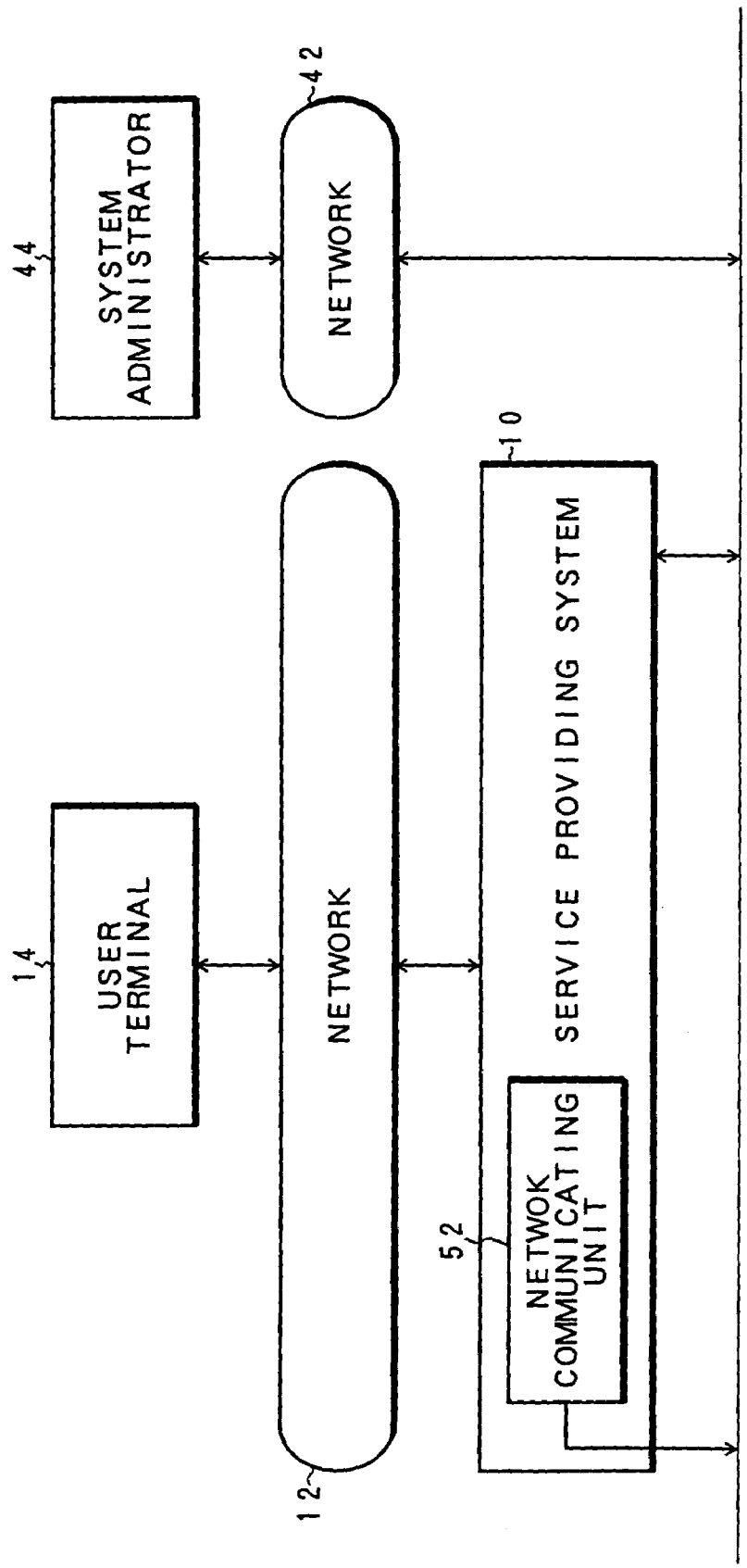

ILLEGAL ACCESS DISCRIMINATING APPARATUS AND METHOD

BACKGROUND OF THE INVENTION

1. Field of the Invention

The invention relates to illegal access discriminating apparatus and method for discriminating an illegal access of an attacker to a service providing system. More particularly, the invention relates to illegal access discriminating apparatus and method for discriminating an illegal access of an attacker when an authentication is requested to a service providing system by combining organic information such as fingerprint, iris, or the like to ID information.

2. Description of the Related Arts

At present, an infrastructure of a communication line is being established, information equipment such as computers or the like are mutually connected through the communication line, and the user can use various services from a remote place. In such a service providing system, when the system is used, whether the user is a legal user or not is confirmed by using a password. In recent years, a technique to confirm the user himself by using organic information such as fingerprint, iris, or the like is being established and it is considered to apply a collation of those organic information to the confirmation of the user himself.

In such a service providing system, however, there is a possibility such that a person with an evil intention except for the legal users can illegally easily attack to various information equipment from a remote place. For example, since a program to automatically find out a password by the own computer from a remote place can be formed, an environment where the criminal can easily commit a crime is being constructed. Therefore, to confirm the user himself in response to an authentication demand to use the system, a security is raised by combining organic information such as fingerprint, iris, or the like to an ID code. However, there is a possibility such that if the organic information of the legal user can be illegally obtained, the equipment of the user is attached by a method such that the organic information is continuously inputted while changing the ID code. It is, therefore, necessary more and more to construct a system which is conscious of an attack from a criminal even if the organic information is used for personal authentication.

SUMMARY OF THE INVENTION

According to the invention, for a service providing system using ID information and organic information for an authentication demand, there are provided illegal access discriminating apparatus and method for supporting the system by monitoring and discriminating an attack of an illegal access person who completely became a normal user.

According to the invention, there is provided an illegal access discriminating apparatus characterized by comprising: a storing unit for inputting and storing ID information and organic information based on an authentication demand which a service providing system received from a user's terminal; a comparing and collating unit for comparing and collating the ID information and organic information inputted to the storing unit with ID information and organic information inputted in the past; and a control unit for discriminating the authentication demand by an illegal access person on the basis of an output of the comparing and collating unit and notifying the service providing system of a discrimination result. As mentioned above, the invention is based on an idea such that when the user requests an authentication for confirmation of the user himself to the system by using the ID information and organic information and they are compared with the stored ID information and organic information of the authentication demand performed in the past, thereby presuming and discriminating whether the access is an illegal access by the attacker or not. If it is determined that there is a possibility of an attack from the attacker who intends to illegally invade the system, a fact that the access is the illegal access is notified to the service providing system, thereby allowing the user to refuse the presentation of services and preventing the invasion.

The storing unit comprises: an input storing unit for inputting and temporarily storing the ID information and organic information based on the authentication demand which the service providing system received from the user; and a use information storing unit for storing the ID information and organic information based on the authentication demand which the service providing system received from the user in the past. Specifically speaking, the attack of the attacker uses the own organic information or forged organic information, combines the ID information to it at random, and sequentially transmitting an authentication demand, thereby trying to invade the system. Therefore, the form of the attack can be classified to the following three forms.

Attack form 1: The organic information is fixed and an attack is performed while successively changing the ID information.

Attack form 2: The ID information is fixed and an attack is performed while successively changing the organic information.

Attack form 3: An attack is performed while successively changing both the organic information and the ID information The control unit of the invention has the following discriminating rules about the illegal access corresponding to those attack forms.

[Discriminating Rule 1]

The control unit determines the authentication demand by the illegal access person in the case where the ID information does not coincide and the organic information coincides on the basis of an output of the comparing and collating unit. This form corresponds to the attack form 1 and relates to the case where the attacker uses the forged organic information or the own organic information and combines it to the ID information of a plurality of users and requests an authentication. For example, in case of using a fingerprint as organic information, the attacker repeats the operation for inputting the ID number of the user and pressing a fingerprint scanner while changing the Id.

[Discriminating Rule 2]

The control unit determines the authentication demand by the illegal access person in the case where the ID information coincides and the organic information does not coincide on the basis of the output of the comparing and collating unit. This form corresponds to the attack form 2 and relates to the case where the attacker uses the forged organic information or the own organic information and combines it to the specific ID information and requests an authentication. For example, in case of using a fingerprint as organic information, the attacker repeats the operation for inputting the same ID number and pressing fingerprint scanner while changing the finger.

[Discriminating Rule 3]

The control unit determines the authentication demand by the illegal access person in the case where the ID information does not coincide and the organic information coincides or in the case where the ID information coincides and the organic information does not coincide on the basis of the output of the comparing and collating unit. This form corresponds to the attack form 3 and relates to the case where the attacker uses the forged organic information or the own organic information and combines it to the ID information of a plurality of users and requests an authentication. For example, in case of using a fingerprint as organic information, the attacker repeats the operation for pressing the fingerprint scanner while changing the finger by changing the ID number of the user.

[Discriminating Rule 4]

The storing unit stores a telephone number serving as a transmitting source or, a terminal position such as a network address or the like, and an input time in correspondence to the ID information and organic information which were inputted in the past. The control unit determines the authentication demand by the illegal access person in the case where a result of a comparison between ID information newly inputted from the same terminal and the ID information inputted from the same terminal within a past predetermined time indicates the dissidence.

The above discrimination is performed by paying an attention to a point that the attacker usually automatically and concentratedly perform a large number of authentication demands by using a computer. The illegal use can be discriminated without collating with the organic information which was inputted in the past.

[Discriminating Rule 5]

The control unit discriminates whether the past ID information has serial number for the inputted ID information or not and determines the authentication demand by the illegal access person at a designated predetermined number of times in the case where it is decided that the past ID information has the serial number.

When the ID information of the users is continuously inputted on the basis of the serial number, a possibility of the attack from the attacker is further high. This is because there is considered a case where the attacker sequentially attacks by using the computer. Therefore, by checking whether the inputted IDs have the serial number or not, the user can have a confidence indicative of the attack from the attacker and a probability about the illegal access is improved.

[Discriminating Rule 6]

The control unit detects combinations such that the organic information coincides and the ID information does not coincide when the inputted organic information and the organic information inputted in the past coincide and determines the authentication demand by the illegal access person when the number of combinations reaches predetermined number of times.

On the other hand, there is also a case where the attacker does not illegally access but the legal user merely erroneously inputs the ID information.

Therefore, the user can input again ID information up to, for example, three times, thereby avoiding that the mistake of the input of the ID information is erroneously recognized as an illegal access.

The comparing and collating unit comprises: an ID information comparing unit for comparing the inputted ID information and the ID information inputted in the past and generating a signal indicative of the coincidence or dissidence; and an organic information collating unit for comparing the inputted organic information and the organic information inputted in the past, generating a signal indicative of the coincidence of the organic information when a value of a predetermined coincidence degree or more is obtained, and generating a signal indicative of the dissidence of the organic information when a value less than the predetermined coincidence degree is obtained, thereby enabling the comparison and collation of the ID information and the organic information to be individually performed.

The illegal access discriminating apparatus of the invention further has a timer unit to measure the time, and the ID information and the organic information inputted in the past after the elapse of a predetermined time from the storage are erased and excluded from the targets of comparison and collation. In the case where the legal user does not illegally intend to access but merely erroneously input the ID information, if such a fact is stored for a long time, a situation such that in spite of a fact that the user is a legal user himself, the access is determined to be the illegal access, and he cannot access can occur. Therefore, a time limitation is provided for the storage and those information is erased after the elapse of a predetermined time, thereby avoiding a situation such that the access is erroneously recognized as an illegal access. Generally, since the attacker concentratedly attacks in a short time, even if the time limitation is provided for the storage, the storage to discriminate the illegal access of the attacker can be sufficiently obtained. Therefore, even if the legal user erroneously inputs the ID information any times, the system can be used. Further, since the storage time is limited, a memory amount of ID information and organic information which were inputted in the past is limited and a burden on the collation and comparison between the ID information and organic information which are newly inputted is reduced.

The storing unit stores a telephone number serving as a transmitting source or a terminal position such as a network address or the like together with the ID information and organic information which were inputted in the past. The comparing and collating unit compares and collates the inputted ID information and organic information with the ID information and organic information which were inputted in the past from the same terminal position. There is a case where the attacker attacks as a round robin from a specific terminal by using the forged organic information and the own organic information. In this case, the operation to compare and collate the inputted ID information and organic information with all of the ID information and organic information which were inputted in the past becomes a large burden. Therefore, by limiting the terminals to perform the comparison and collation of the ID information and organic information to a specific terminal to which information is at present being inputted, the burden on the comparison and collation is reduced.

The illegal access discriminating apparatus of the invention further has a log recording unit to record information of the illegal access person. At least any of the organic information of the illegal access person, or the telephone number of the illegal access person or the terminal position such as a network address or the like, and the ID information serving as a target of the illegal access is recorded in the log recording unit. When considering that it is difficult to steal the organic information as compared with the ID information, a probability such that the used organic information is the information of the attacker is high. By logging such organic information, it can be used as a clue of criminal investigation and can be used to specify the illegal access person or an evidence. By storing the position of the terminal, the time, and the like, they become clues of criminal investigation. When there is an attack from the attacker, the terminal can be actively examined with reference to the log recording unit. Further, by recording and storing the ID information which became the target of the attack, it can be used for a security measure against the re-attack.

The illegal access discriminating apparatus of the invention further comprises: an authentication demand terminal address recording unit for recording the number of times of authentication demand every terminal address; and a same terminal access detecting unit for detecting that the authentication demand has been performed a predetermined number of times or more within a predetermined time by referring to the authentication demand terminal address and activating the comparing and collating unit and the control unit, thereby allowing an illegal access to be discriminated. Only in the case where the number of times of authentication demand from the same terminal such that it cannot be considered in ordinary works is detected, the discrimination of the illegal access based on the comparison and collation of the ID information and organic information is activated and a processing burden on the illegal discrimination can be reduced. As organic information which is used in the illegal access discriminating apparatus, a fingerprint, a voiceprint, an iris pattern, a retina blood vessel pattern, a palm shape, an ear shape, a face, a signature, or the like is used. It can be assumed that those organic information is peculiar to the human being. The illegal access is discriminated on the assumption that a situation such that the organic information is the same in spite of a fact that the ID information differs does not occur.

When the authentication demand by the illegal access person is decided, the control unit automatically notifies the service providing system administrator of the discrimination result. The automatic notification to the administrator by the control unit is performed by using a fixed telephone, a cellular phone, an E-mail, a dedicated communication line, a warning light, or the like. If it is decided that there is an attack from the attacker, by notifying such a fact from the system side to the system administrator side, the system administrator doesn't need to always monitor the system, so that a management burden on the administrator side is reduced. In the automatic notification, by using a telephone or E-mail which is widely spread, the costs can be reduced.

The invention further provides an illegal access discriminating method, comprising:

a storing step of inputting and storing ID information and organic information based on an authentication demand which a service providing system received from the user;

a comparing and collating step of comparing and collating the inputted ID information and organic information with ID information and organic information which were inputted in the past; and a discrimination control step of discriminating an authentication demand by an illegal access person on the basis of an output in said comparing and collating step and notifying the service providing system of a discrimination result. The details of the illegal access discriminating method are fundamentally the same as those of the apparatus construction.

The above and other objects, features, and advantages of the present invention will become more apparent from the following detailed description with reference to the drawings.

BRIEF DESCRIPTION OF THE DRAWINGS

FIG. 2 is an explanatory diagram of a use information storing unit in FIG. 1 having a fixed storage capacity;

FIG. 5 is an explanatory diagram of an illegal access and the use information storing unit to which a discriminating rule 3 in which both the ID information and the organic information are changed is applied;

FIGS. 9A and 9B are block diagrams of the third embodiment of the invention having a time measuring function and an automatic notifying function to a system administrator;

FIG. 10 is an explanatory diagram of a use information storing unit in FIGS. 9A and 9B;

FIGS. 12A and 12B are block diagrams of the third embodiment of the invention having a storing function of a terminal address;

DETAILED DESCRIPTION OF THE PREFERRED EMBODIMENTS

Figure 1:
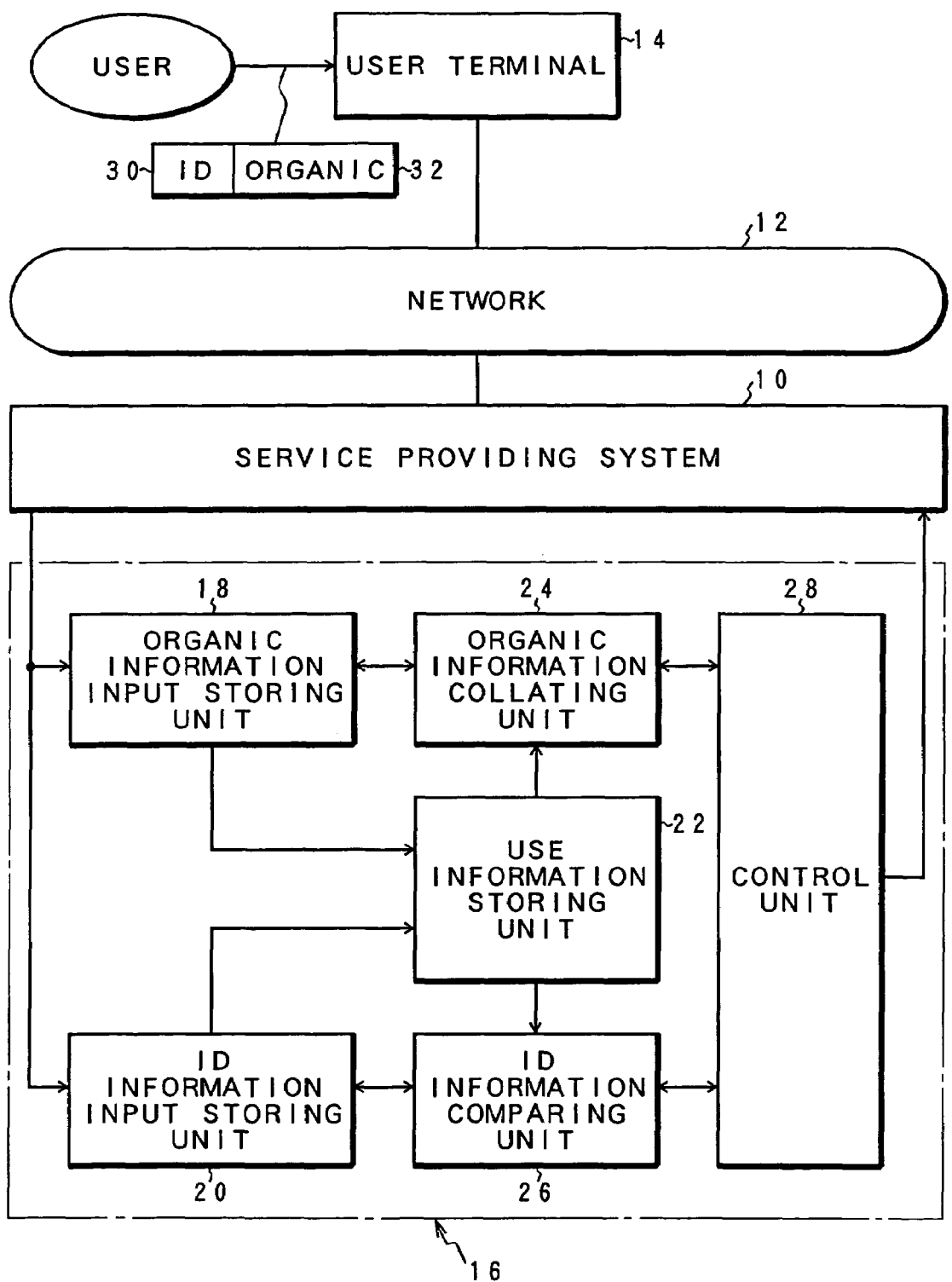
FIG. 1 is a block diagram of the first embodiment of the invention for comparing and collating input information of an authentication demand and all of past input storage information, thereby discriminating an illegal access.

FIG. 1 is a block diagram of the first embodiment of an illegal access discriminating apparatus of the invention. A service providing system 10 serving as a discrimination target of an illegal access according to the invention receives a service request from a user terminal 14 through a network such as Internet, Intranet, or the like and provides a service requested by the user in an on-line manner. Such a service providing system 10 is a system for providing a proper service such as a database system having an on-line searching function or the like. For example, it is a system which is used by a great number of legal users exceeding million users or the like. When the user uses the service providing system 10 by an access from the user terminal 14, the user inputs ID information 30 and organic information (LB information) 32 peculiar to the user which have previously been registered on the service providing system 10 side and issues an authentication demand (authentication demand to confirm the user himself) to confirm that he is a legal user from the user terminal 14 to the service providing system 10 via the network 12. In the embodiment, an example of using a fingerprint as organic information 32 which is inputted by the user will be described. However, organic information such as iris, voiceprint, retina blood vessel distribution, signature, or the like other than the fingerprint can be used. Although the kind of organic information differs depending on an organic information collating system provided on the service providing system 10 side, for example, in case of a fingerprint, a fingerprint image or organic key information extracted from the fingerprint image is used. When the user requests to use the service providing system 10, the ID information 30 and organic information 32 of the legal user have previously been registered on the service providing system 10 side. Therefore, when the user inputs the ID information 30 and organic information 32 and requests the authentication from the user terminal 14 to the service providing system 10, the pre-registered organic information 32 is read out in correspondence to the authentication demanded ID information 30 on the service providing system 10 side. The inputted organic information 32 and the registered organic information are collated. When a coincidence degree of a predetermined value or more is obtained, it is determined that the organic information is the same (collation coincidence) and the use of the service providing system 10 is permitted to the authenticated demanded user terminal 14. To discriminate an illegal access by an attacker, an illegal access discriminating system 16 of the invention is provided as a supporting apparatus for the service providing system 10 using a combination of the ID information 30 and organic information 32 for such an authentication demand. The illegal access discriminating system 16 is constructed by: an organic information input storing unit 18; an ID information input storing unit 20; a use information storing unit 22; an organic information collating unit 24; an ID information comparing unit 26; and a control unit 28. When the authentication demand using the ID information 30 and organic information 32 is issued from the user terminal 14 to the service providing system 10, the organic information 32 and ID information 30 inputted to the service providing system 10 are temporarily inputted and stored into the organic information input storing unit 18 and ID information input storing unit 20, respectively. The ID information and organic information which were inputted in the past by the authentication demand from the user terminal 14 to the service providing system 10 have been stored as pairs in the use information storing unit 22.

FIG. 2 shows storage contents in the use information storing unit 22 in FIG. 1. The use information storing unit 22 has an ID information storing area 22-1 and an organic information storing area 22-2 and stores the ID information and organic information as pairs like, for example, (ID01, LB01), (ID05, LB05), . . . . A storing area of the use information storing unit 22 has a memory capacity which is determined by, for example, hexadecimal addresses 0000 to FFFF, so that the pairs of ID information and organic information which were inputted latest as many as only a fixed number which is determined by a physical memory capacity are stored.

Referring again to FIG. 1, when the organic information is inputted and stored into the organic information input storing unit 18, the organic information collating unit 24 collates it with the organic information which was inputted in the past and stored in the use information storing unit 22. In the collation of the organic information, a coincidence degree between the inputted organic information and the organic information which was inputted in the past is obtained. If the coincidence degree is equal to or larger than a predetermined value, an output of the collation coincidence is generated. If the coincidence degree is less than a predetermined value, an output of the collation dissidence is generated. Since the processes for collating and comparing the organic information and the ID information by the organic information collating unit 24 and ID information comparing unit 26 are based on the inputs of the ID information and organic information from the user terminal 14 to the service providing system 10, the processing operations for collating and comparing are simultaneously performed. The control unit 28 receives a collation result of the organic information collating unit 24 and a comparison result of the ID information comparing unit 26, discriminates about the illegal access by the attack from the attacker, and notifies the service providing system 10 of a discrimination result.

The discrimination about the illegal access by the control unit 28 is performed on the basis of the following three discriminating rules.

Discriminating Rule 1:

When the ID information does not coincide and the organic information coincides on the basis of the comparison and collation results, it is determined that there is an authentication demand by the illegal access person.

Discriminating Rule 2:

When the ID information coincides and the organic information does not coincide on the basis of the comparison and collation results, it is determined that there is an authentication demand by the illegal access person.

Discriminating Rule 3:

When the ID information does not coincide and the organic information coincides or when the ID information coincides and the organic information does not coincide on the basis of the comparison and collation results, it is determined that there is an authentication demand by the illegal access person.

Figure 3:
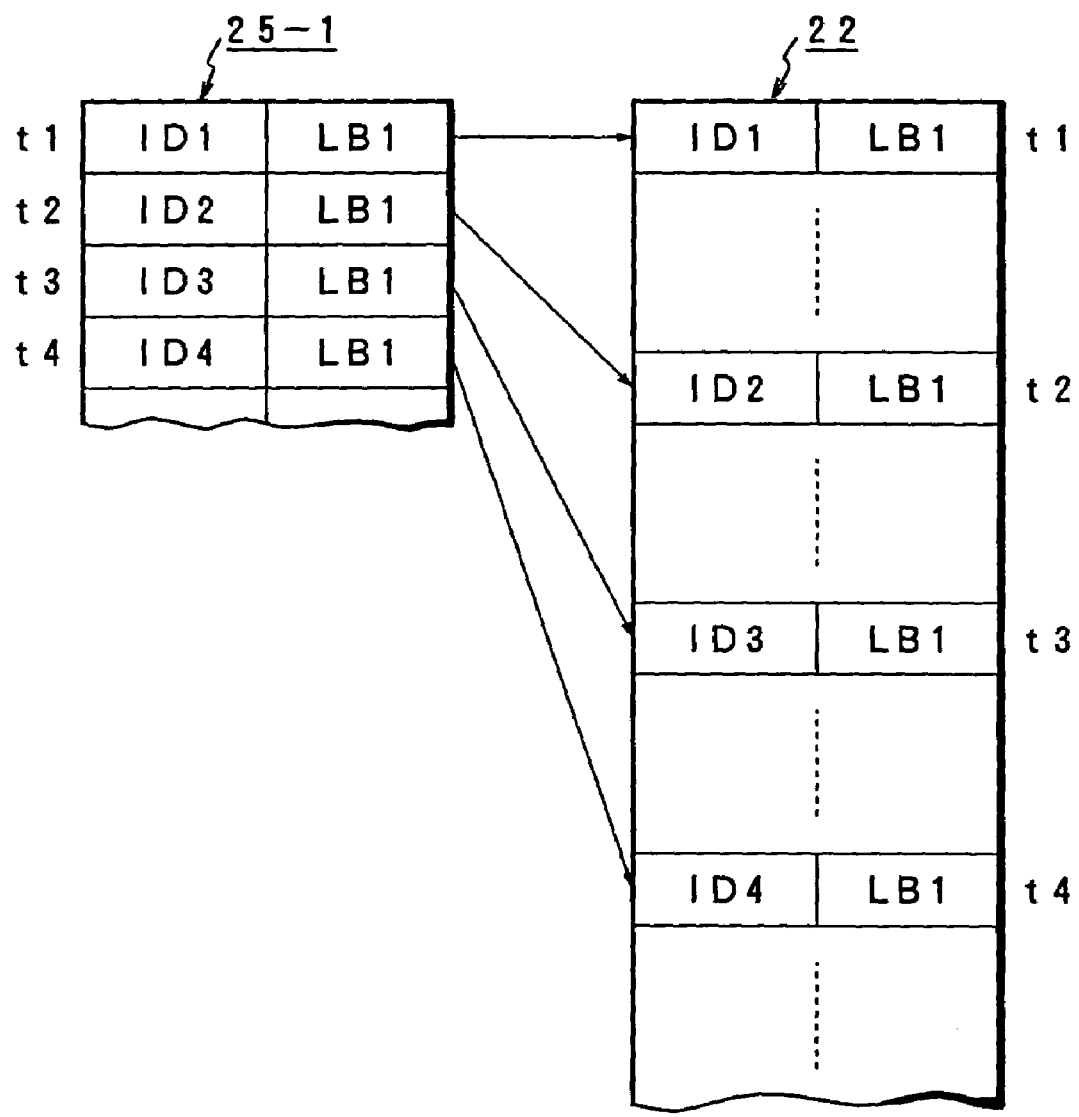
FIG. 3 is an explanatory diagram of an illegal access and the use information storing unit to which a discriminating rule 1 in which the organic information is fixed and ID information is changed is applied.

FIG. 3 shows the illegal access which is discriminated by the control unit 28 in accordance with the discriminating rule 1 and storage contents in the use information storing unit 22 at that time. An illegal access 25-1 relates to a case where the attacker attacks while changing the ID information to ID1, ID2, ID3, and ID4 by using one organic information LB1 by the own fingerprint or forged fingerprint. Specifically speaking, the attacker repeats the operation for inputting the ID number of the legal user and pressing the fingerprint scanner while changing the ID. In response to the illegal authentication demand by the attacker of such an illegal access 25-1, the pairs (ID1, LB1), (ID2, LB1), (ID3, LB1), and (ID4, LB1) of the inputted ID information and organic information are stored in the use information storing unit 22 of the illegal access discriminating system 16 of the invention in correspondence to input times t1 to t4 of the illegal access 25-1. Although the illegal access 25-1 by the attacker is continuously performed at times t1 to t4, since the system also accepts authentication demands from the other legal users for such a period of time, the storage corresponding to the illegal access 25-1 is discretely performed in the use information storing unit 22 as shown in the diagram. If such an attacker performs an illegal authentication demand by combining a plurality of ID information to one organic information, the discriminating rule 1 is applied to the control unit 28 of the invention. According to the discriminating rule 1, when the ID information does not coincide and the organic information coincides on the basis of the comparison and collation results, it is determined that there is an authentication demand by the illegal access person. The discriminating process to the illegal access 25-1 in FIG. 3 by the discriminating rule 1 is as follows. First, with respect to the input pair (ID1, LB1) of the first illegal access at time t1, even if it is compared and collated with the pair stored in the use information storing unit 22, since there is no relevant pair, both the ID information and the organic information do not coincide. Subsequently, when the input pair (ID2, LB1) by the second illegal access is inputted at time t2, since the illegal input pair (ID1, LB1) at time t1 has already been stored in the use information storing unit 22 at this time, by the comparison and collation between the illegal input pair inputted at time t2 and the pair which was inputted at time t1 and has already been stored, the ID information does not coincide and the organic information coincides, so that the condition of the discriminating rule 1 is satisfied. Therefore, at a point when the pair (ID2, LB1) by the illegal access is inputted at time t2, the control unit 28 of the invention determines that there is the authentication demand by the illegal access person in accordance with the discriminating rule 1. As for the input of the pair (ID3, LB1) by the illegal access at time t3, the condition of the discriminating rule 1 in which the ID information does not coincide and the organic information coincides is satisfied between the two pairs (LD1, LB1) and (LD2, LB1) stored in the use information storing unit 22 at times t1 and t2, so that the illegal accesses as many as two times can be discriminated. Further, with respect to the input of the pair (ID4, LB1) by the illegal access at time t4, the authentication demands by the illegal access person as many as three times are determined by the comparison and collation among the three stored pairs at times t1 to t3 inputted in the past and stored in the use information storing unit 22.

Figure 4:
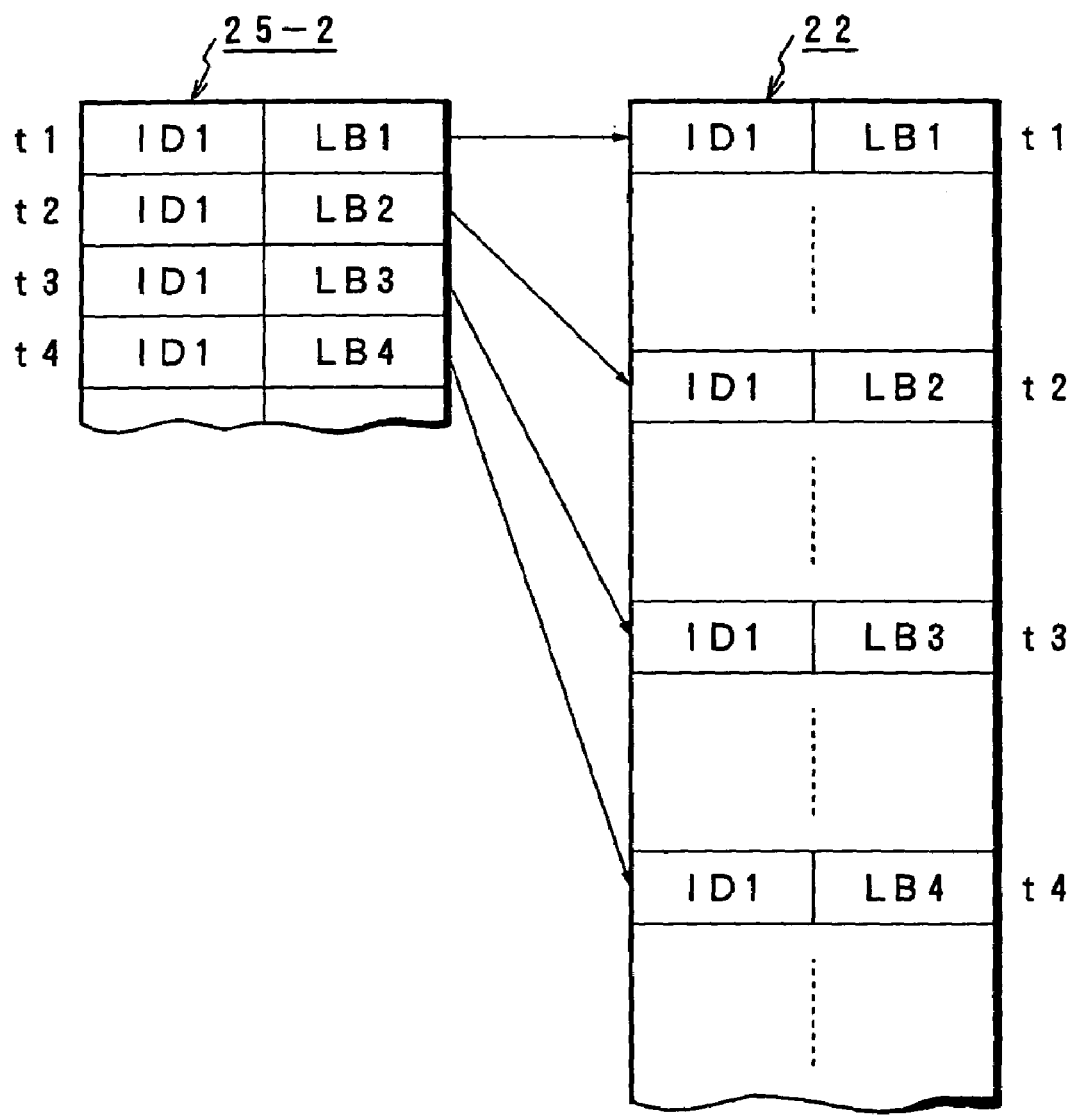
FIG. 4 is an explanatory diagram of an illegal access and the use information storing unit to which a discriminating rule 2 in which the ID information is fixed and the organic information is changed is applied.

FIG. 4 shows the illegal access to which the discriminating rule 2 by the control unit 28 in FIG. 1 is applied and storage contents in the use information storing unit 22 at that time. According to the discriminating rule 2, when the ID information coincides and the organic information does not coincide on the basis of the comparison and collation results, it is determined that there is an authentication demand by the illegal access person. The discriminating rule 2 assumes the case where the attacker uses the forged organic information or own organic information and combines it to specific ID information and requests the authentication. For example, it relates to the case like an illegal access 25-2 in FIG. 4 where the attacker uses ID1 as specific ID information and combines the own organic information or forged organic information LB1, LB2, LB3, and LB4 to ID1 and requests the authentication. Specifically speaking, the attacker repeats the operation for inputting the same ID number and pressing the fingerprint scanner while changing the finger. As mentioned above, if there is the illegal access 25-2 such that the attacker requests the authentication by using the fixed ID information while changing the organic information, the input pair of the illegal access is discretely stored in the use information storing unit 22 in correspondence to it. As for such an illegal access 25-2, the discrimination about the illegal access by the discriminating rule 2 is performed in the following manner. First, when the pair (ID1, LB1) by the illegal access at time t1 is inputted, since the pair corresponding to the illegal access is not stored in the use information storing unit 22, the comparison and collation results with respect to both the ID information and the organic information indicate dissidence and the illegal access by the discriminating rule 2 cannot be discriminated. Subsequently, when the pair (ID1, LB2) by the illegal access 25-2 is inputted at time t2, since the pair (ID1, LB1) which was inputted at time t1 and stored exists in the use information storing unit 22, the condition of the discriminating rule 2 such that the ID information coincides and the organic information does not coincide is satisfied by the comparison and collation of both pairs, so that it is determined that there is the authentication demand by the illegal access person. With regard to times t3 and t4 of the illegal access as well, since the stored pairs by the illegal access exist before such time points, it is similarly determined that there is the authentication demand by the illegal access person in accordance with the discriminating rule 2. In case of time t3, the number of times of discrimination about the illegal access is equal to 2 and that at time t4 is equal to 3.

FIG. 5 is an explanatory diagram of the illegal access to which the discriminating rule 3 to discriminate the illegal access by the control unit 28 in FIG. 1 is applied and storage contents in the use information storing unit 22 at that time. The discriminating rule 3 corresponds to the case where the illegal accesses presumed by the discriminating rule 4 in FIG. 3 and the discriminating rule 2 in FIG. 4 mixedly exist. That is, according to the discriminating rule 3, when the ID information does not coincide and the organic information coincides or when the ID information coincides and the organic information does not coincide on the basis of the comparison and collation results, it is determined that there is an authentication demand by the illegal access person. An illegal access 25-3 relates to the case where the attacker performs an attack such that, for example, three ID1, ID2, and ID3 are prepared as a plurality of ID information, the own fingerprint or three fingerprints LB1, LB2, and LB3 are further prepared as organic information, and an authentication demand is performed as shown at times t1 to t9 by using the pairs comprising the combinations of them. In the case where there is an input pair of the authentication demand by such an illegal access 25-3, the illegal access is discriminated by the discriminating rule 3 in accordance with the following manner. First, in the pairs (ID1, LB1), (ID2, LB2), and (ID3, LB3) of the illegal access 25-3 at times t1 to t3, when they are compared with the pairs stored in the use information storing unit 22 at the respective input time points, comparison results indicate dissidence with respect to both the ID information and the organic information. Therefore, not only the illegal accesses by the discriminating rules 1 and 2 which have already been described but also the illegal access by the discriminating rule 3 in this case cannot be discriminated. Subsequently, when the pair (ID1, LB3) of a different combination although it has already been used is inputted at time t4 by the illegal access, the condition of "the ID information does not coincide and the organic information coincides" of the discriminating rule 1 which has already been described is satisfied between the storage pair (ID3, LB3) at time t3 stored in the use information storing unit 22 and the input pair (ID1, LB3) at time t4, so that it is determined that there is an authentication demand by the illegal access person. At the same time, the condition of "the ID information coincides and the organic information does not coincide" of the discriminating rule 2 which has already been described is satisfied between the storage pair (ID1, LB1) at time t1 and the input pair (ID1, LB3) at time t4, so that it is likewise determined that there is an authentication demand by the illegal access person. As mentioned above, according to the discriminating rule 3, when the attacker performs the illegal authentication demand while changing both the ID information and the organic information like an illegal access 25-3, the discrimination results of the illegal access by both the discriminating rules 1 and 2 are simultaneously obtained at a certain input time point. This point is similarly applied to the input pairs of the illegal access at times t5 and t6. Further, with respect to the input pairs of the illegal access at times t7 to t9, since the two same ID information and the two same organic information respectively exist at times t1 to t3 and times t4 to t6 of the use information storing unit 22, for example, as for the input pair (ID1, LB2) by the illegal access at time t2, the discrimination results of the illegal access of two times by each of the discriminating rules 1 and 2 are obtained, so that the total four discrimination results of the illegal access can be simultaneously obtained. This point is similarly applied to the input pairs of the illegal access at times t8 and t9. As a method of using the discriminating rules 1 to 3 for three kinds of illegal accesses by the control unit 28, in the case where it is difficult to forge the organic information, since the attacker changes the ID information by using the same organic information, it is sufficient to use the discriminating rule 1. On the other hand, in the case where it is relatively easy to forge the organic information, it is sufficient to use the discriminating rule 2 to determine the illegal access in the case where the ID information coincides and the organic information does not coincide. The most powerful discriminating rule is the discriminating rule 3 corresponding to the case where the attacker changes both the ID information coincides the organic information.

Figure 6:
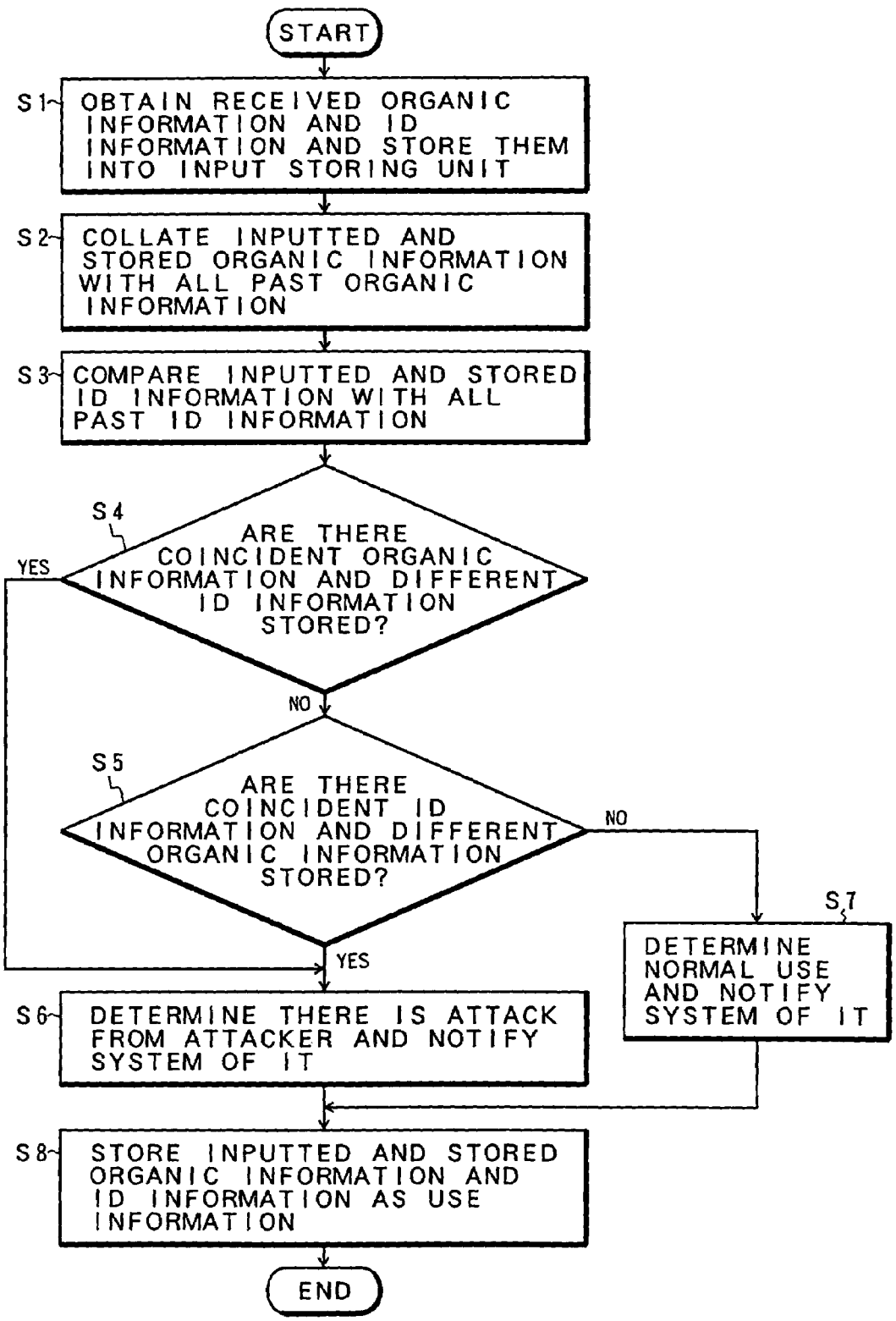
FIG. 6 is a flowchart for an illegal access discriminating process in FIG. 1.

FIG. 6 is a flowchart for the illegal access discriminating process in the first embodiment of the illegal access discriminating system 16 in FIG. 1 and the discriminating rule 3 shown in FIG. 5 is applied as a discriminating rule of the control unit 28. First in step S1, when there is an authentication demand from the user terminal to the service providing system 10, the ID information and organic information received in response to the authentication demand are obtained in step S1 and stored into the organic information input storing unit 18 and ID information input storing unit 20, respectively. Subsequently, in step S2, the inputted and stored organic information is collated with all of the organic information stored in the use information storing unit 22. In step S3, the inputted and stored ID information is compared with all of the ID information stored in the use information storing unit 22. Results by the collation of the organic information and the comparison of the ID information in steps S2 and S3 are notified to the control unit 28. In steps S4 and S5, the discrimination of the comparison and collation results according to the discriminating rule 3 is performed. First, step S4 relates to the discrimination by the discriminating rule 1 and a check is made to see if the organic information coincides and the ID information differs. When the condition in step S4 is satisfied, step S6 follows and it is determined that there is an attack from the attacker and this fact is notified to the service providing system 10. In step S5, a check is made to see if there is the storage pair according to the discriminating result 2 in which the ID information coincides and the organic information differs. When the condition in step S5 is satisfied, step S6 follows and it is determined that there is an attack from the attacker and this fact is notified to the service providing system 10. On the other hand, when the condition of the discriminating rule 1 in step S4 is not satisfied and the condition of the discriminating rule 2 is not satisfied in step S5, it is determined that there is not an attack from the attacker and this fact is notified to the service providing system 10. Even if the collation coincidence is obtained between the ID information and organic information inputted at that time and the ID information and organic information which have previously been registered, the service providing system 10 which received the notice indicative of the attack from the attacker from the illegal access discriminating system 16 of the invention requests the user side to input other user information, for example, a birthday or the like other than the ordinary authentication, thereby taking a defensive measure against the illegal access. If it is known that the contents of the illegal access notified from the illegal access discriminating system 16 obviously indicate the attack by the attacker like, for example, an illegal access 25-3 in FIG. 5, a warning is issued to the user and the presentation of the services is refused. That is, by receiving the notice indicative of the authentication demand by the illegal access person from the illegal access discriminating system 16 according to the invention, the service providing system 10 can promptly take a proper defensive measure corresponding to the contents of the illegal access. In step S8 subsequent to step S6 or S7, the organic information and the ID information which have temporarily stored in the organic information input storing unit 18 and ID information input storing unit 20 in step S1 are stored into the use information storing unit 22. In this case, if the use information storing unit 22 is filled with the information, the oldest storage pair is provided and a new input pair is stored.

Figure 7:
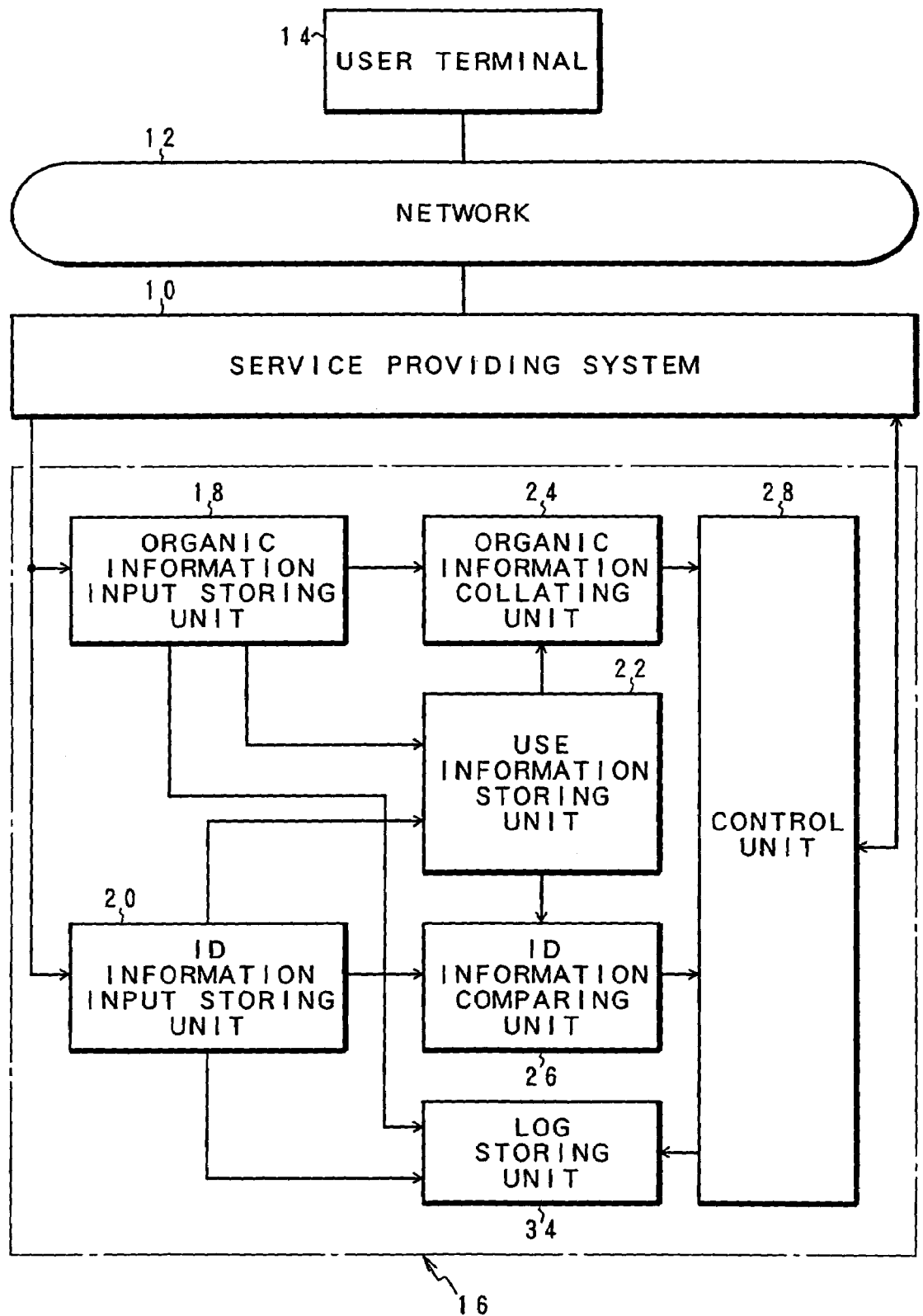
FIG. 7 is a block diagram of the second embodiment of the invention having a logging function to store identify information of an illegal access person.

FIG. 7 is a block diagram of the second embodiment of an illegal access discriminating apparatus of the invention. The second embodiment is characterized in that a log recording unit 34 is further provided for the illegal access discriminating system 16 in FIG. 1. The other construction is substantially the same as that of the embodiment of FIG. 1. When it is determined by the control unit 28 that there is the illegal access by the attack from the attacker, information regarding the identity of the illegal access person is recorded in the log recording unit 34.

The following information is recorded in the log recording unit 34.

I. Organic information at the time of an illegal access
II. Input time of the illegal access
III. Telephone number of the illegal access or network address
IV. ID information as a target of the illegal access The telephone number of the user terminal which performed the illegal access or the network address can be collected from, for example, a protocol layer of a network communicating unit provided for the service providing system 10.

Figure 8A:
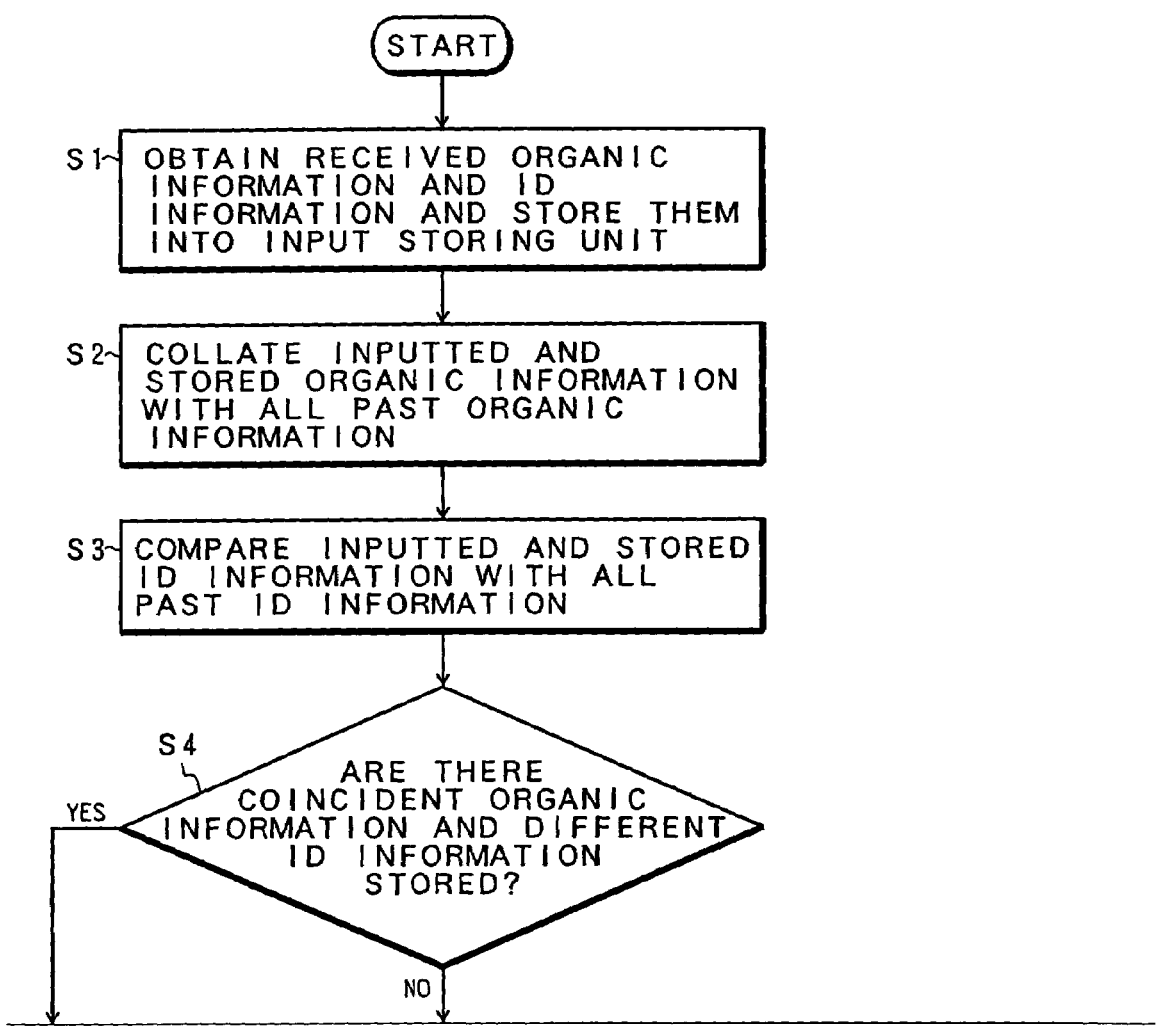
FIGS. 8A and 8B are flowcharts for an illegal access discriminating process in FIG. 7.
Figure 8B:
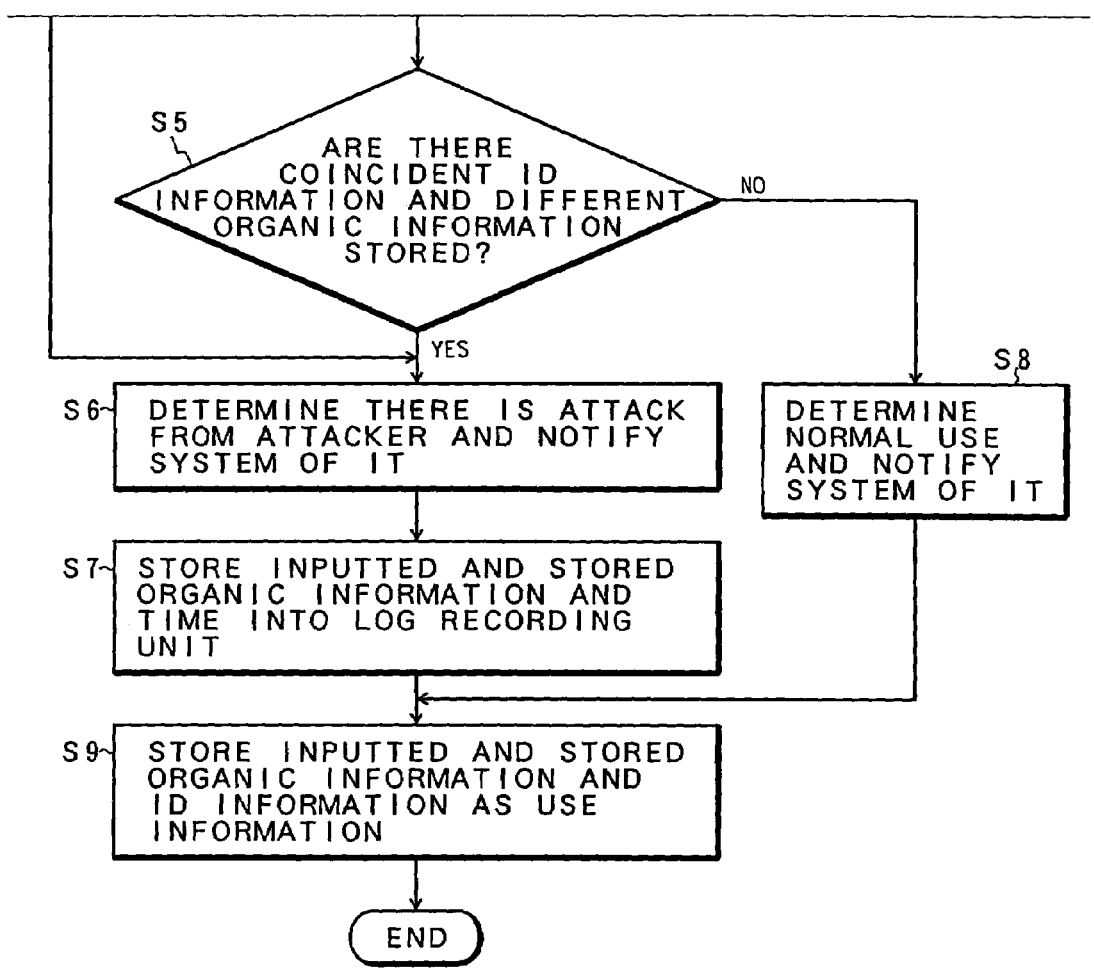

FIGS. 8A and 8B are flowcharts for an illegal access discriminating process according to the second embodiment of FIG. 7. The discrimination about the illegal access by the comparison and collation between the organic information and ID information and the inputted and stored organic information and ID information in steps S1 to S6 is substantially the same as that in the flowchart of FIG. 6 except for the following point. That is, when the illegal access is decided in step S7 after it was determined that there was the attack from the attacker and this fact was notified to the service providing system 10 in step S6, the organic information and the time which were inputted and stored are recorded into the log recording unit 34. As mentioned above, in the second embodiment of FIG. 7, by recording the organic information, time, and the like when the illegal access is decided into the log recording unit 34 and leaving the identity information of the attacker himself, who is the attacker can be proved or the like in the subsequent criminal investigation.

FIGS. 9A and 9B are block diagrams of the third embodiment of an illegal access discriminating apparatus of the invention. The third embodiment is characterized by further providing a timer unit 36 and an E-mail sending unit 38 for the illegal access discriminating system 16 in the second embodiment. The other construction is substantially the same as that of the embodiment of FIG. 1. The timer unit 36 measures and holds "year, month, day, hour, minute" as time information and notifies the use information storing unit 22 and control unit 28 of the time information. The control unit 28 controls the storage contents in the use information storing unit 22 on the basis of the time information from the timer unit 36 and erases the storage pair of the ID information and organic information after the elapse of a predetermined time from the storage. Thus, only the pairs of the ID information and organic information which were inputted in the past within the predetermined time from the input are stored. The number of times of collation and comparison with the past stored information by the organic information collating unit 24 and ID information comparing unit 26 which are executed when the input of the organic information and ID information from the service providing system 10 in response to the authentication demand from the user terminal 14 is received can be limited. The burden on the discriminating process in the illegal access discriminating system 16 can be reduced. Even if the number of pairs of the ID information and organic information which were inputted in the past and stored into the use information storing unit 22 is limited as mentioned above, since the attack from the attacker is usually continuously performed in a short time in many cases, no problem occurs when the illegal access by the attacker is discriminated. Further, in the third embodiment of FIGS. 9A and 9B, since the E-mail sending unit 38 is provided, when it is determined that there is the illegal access by the attack from the attacker, the control unit 28 notifies the E-mail sending unit 38 of a fact that there is the illegal access by the attacker. The E-mail sending unit 38 forms an E-mail to notify a fact that the service providing system 10 was attacked by the attacker, dispatches the formed E-mail to a mail system 40, and transmits it to a system administrator 44 via the network such as LAN, WAN, or the like. Thus, the system administrator can immediately know that there is the attack by the attacker to the service providing system 10. Therefore, the system administrator 44 doesn't need to always monitor a status of the system for the illegal access by checking a log of the service providing system 10 or the like. The burden on the system administrator is remarkably reduced and the system administrator can immediately take a proper countermeasure against the attack of the attacker.

FIG. 10 shows the storage contents in the use information storing unit 22 in FIGS. 9A and 9B. In addition to the ID information storing area 22-1 and organic information storing area 22-2, a time information storing area 22-3 is provided. "9809170935" showing "year, month, day, hour, minute" has been stored like, for example, address "0000h" in the time information storing area 22-3.

The control unit 28 performs a storage control to erase the storage pairs after the elapse of a predetermined time from the stored contents by using the time information stored in the use information storing unit 22 together with the pair of ID information and organic information. For example, now assuming that the present time is labelled to tn and the information was stored into address "8000h", the control unit 28 sets, for instance, a predetermined time (T=60 minutes) as a storage time. Now assuming that the contents at the time that is predetermined time (T=60 minutes) before the present time tn are the storage contents at time tn-1 in address "0001h", the storage contents at time tn-2 in address "0000h" before it are erased. Thus, only the pairs of the ID information and organic information stored for a period of time of (T=60 minutes) from the present time tn are stored together with the time information into the use information storing unit 22. A storage amount in the use information storing unit 22 can be limited to a proper amount that is necessary for the illegal access. The burden on the processes for the comparison and collation between the inputted organic information and ID information and the organic information and ID information stored in the use information storing unit 22 can be reduced.

Figure 11A:
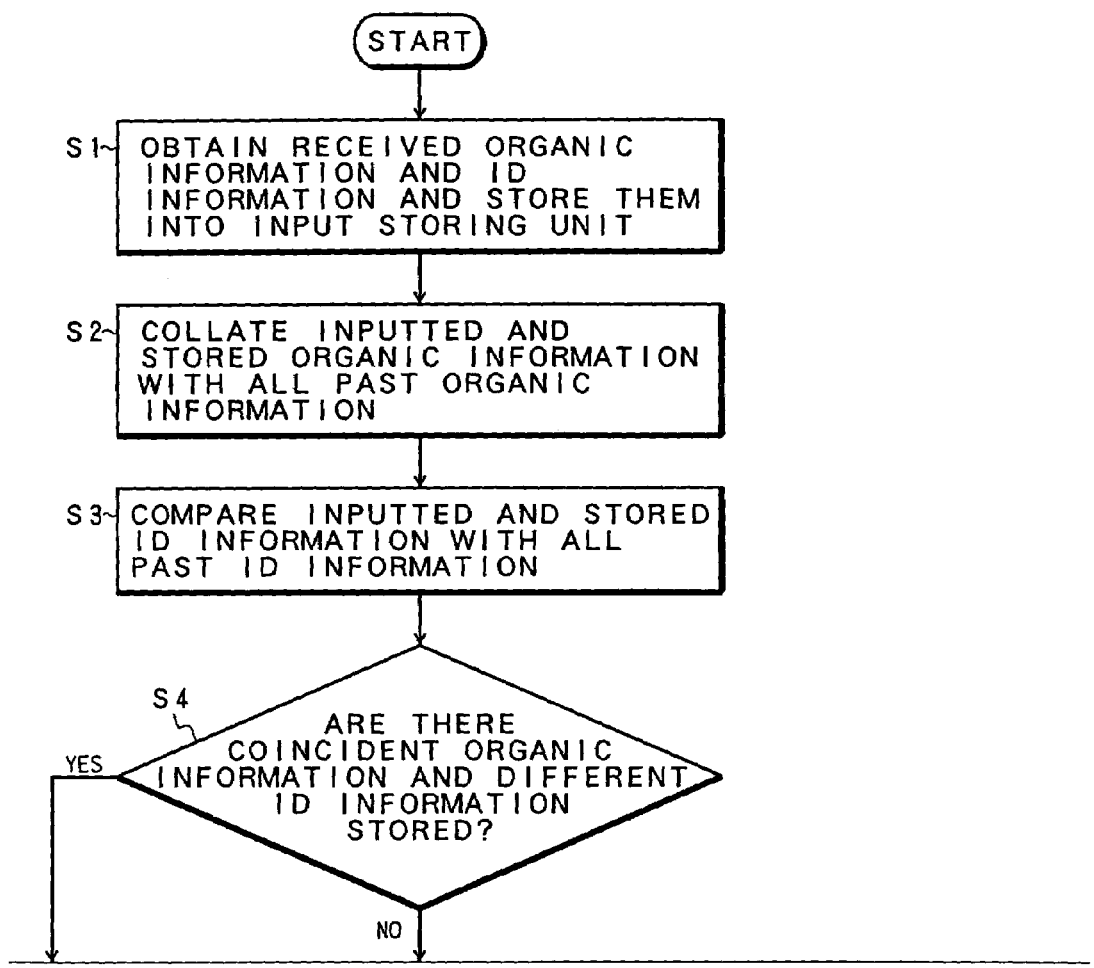
FIGS. 11A and 11B are flowcharts for an illegal access discriminating process in FIGS. 9A and 9B.
Figure 11B:
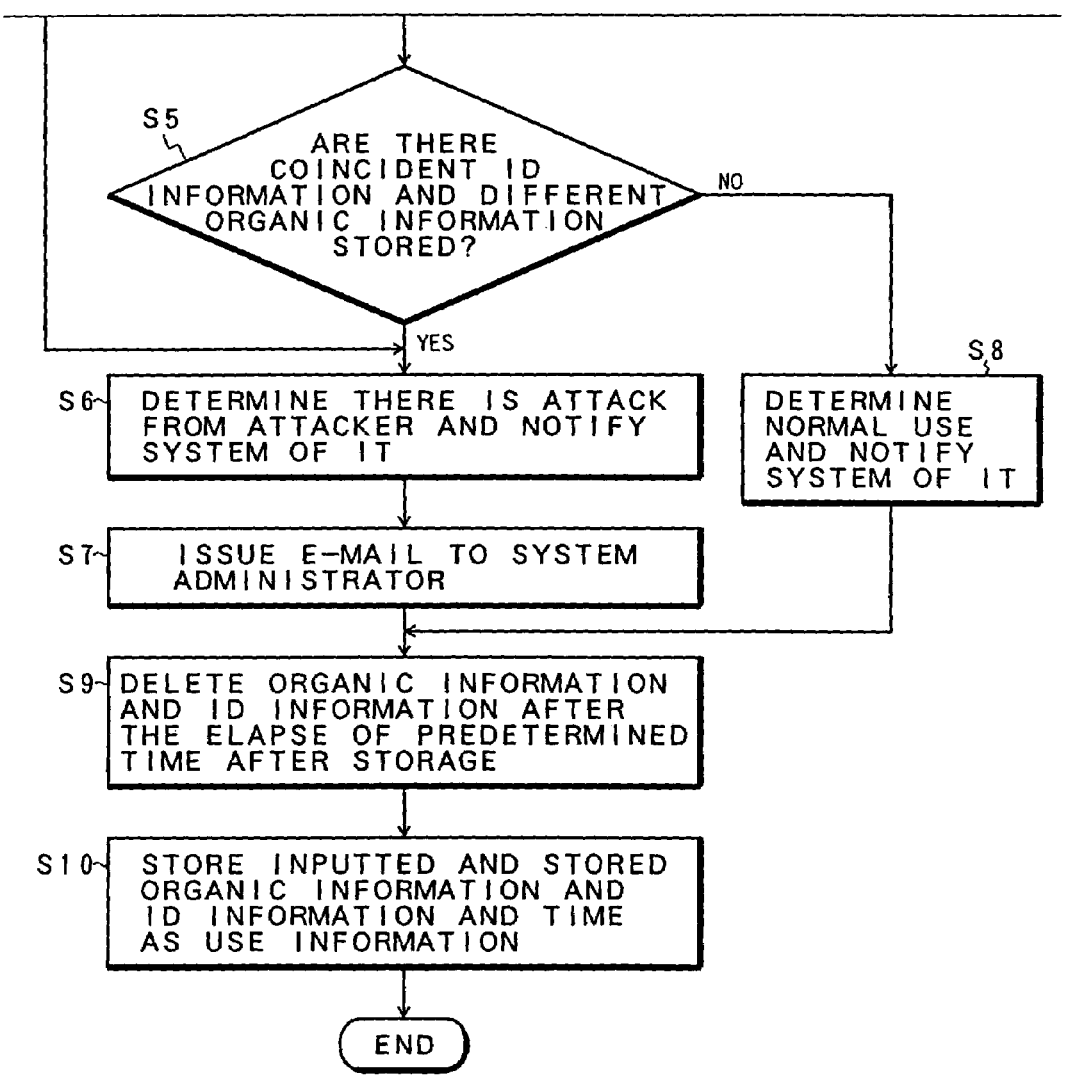

FIGS. 11A and 11B are flowcharts for an illegal access discriminating process in the third embodiment of FIGS. 9A and 9B. The process to discriminate the illegal access by comparing and collating the organic information and ID information which were inputted and stored and the stored organic information and ID information in steps S1 to S6 is the same as that in the flowchart of the second embodiment of FIGS. 8A and 8B. On the other hand, when the illegal access is decided and a fact that there is the attack from the attacker is notified to the service providing system 10 in step S6, the control unit 28 notifies the E-mail sending unit 38 of the fact that the system was attacked by the attacker and issues an E-mail to the system administrator 44 in step S7. Further in next step S9, the control unit 28 erases the stored pairs of the organic information and ID information after the elapse of a predetermined time from the storage by using the time information of the present time sent from the timer unit 36 and the time information stored in the use information storing unit 22 as shown in FIG. 10. After completion of the erasure of the stored pairs, the pair of ID information and organic information which were temporarily inputted and stored in the organic information input storing unit 18 and ID information input storing unit 20 at that time are stored into the use information storing unit 22 together with the time information derived from the timer unit 36 in step S10.

Figure 12B:
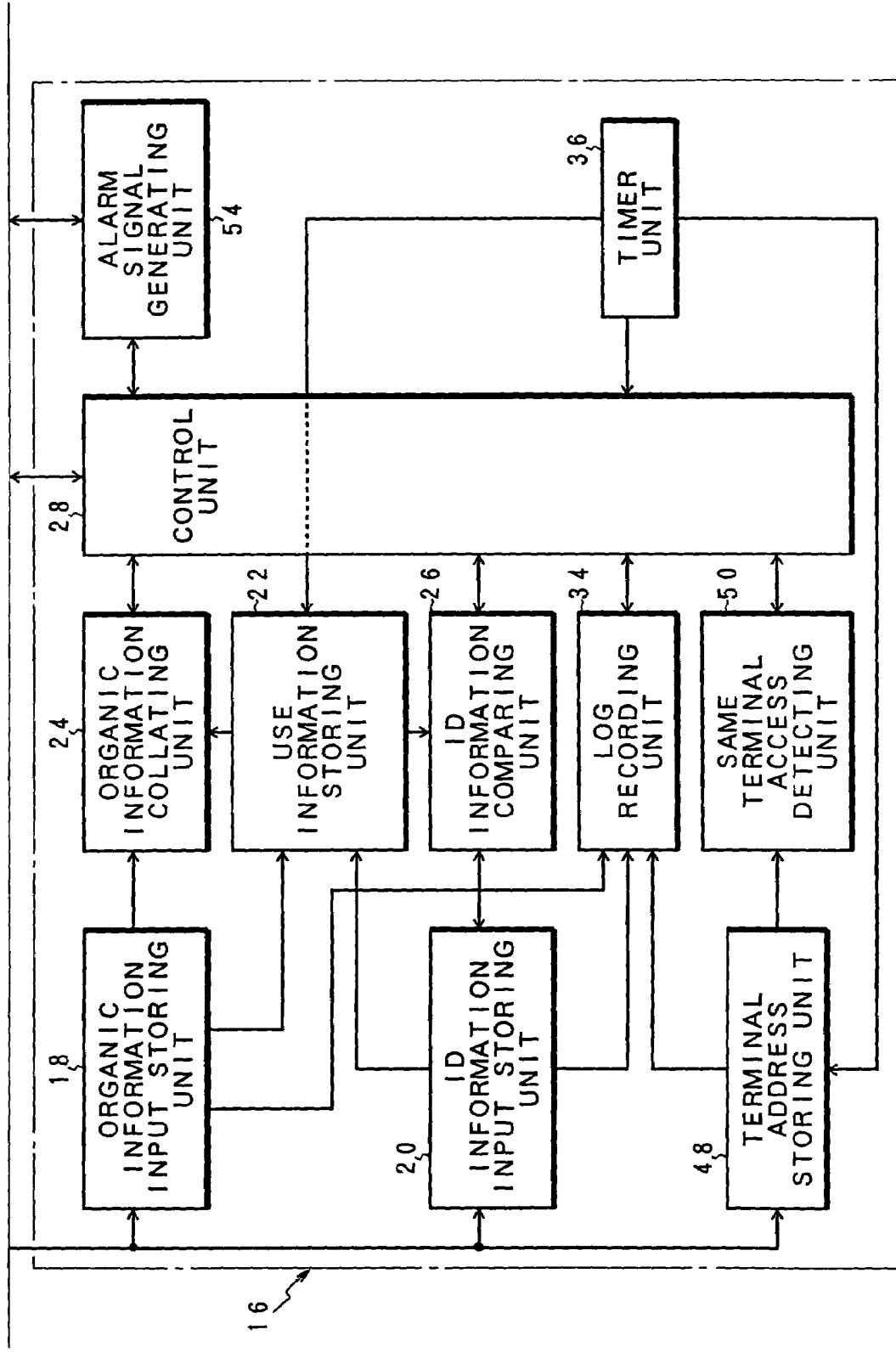

FIGS. 12A and 12B are block diagrams of the fourth embodiment of an illegal access discriminating apparatus of the invention. In the fourth embodiment, a terminal address storing unit 48 and a same terminal access detecting unit 50 are further provided for the third embodiment of FIGS. 9A and 9B. An alarm signal generating unit 54 is provided in place of the E-mail sending unit 38 in FIGS. 9A and 9B. The other construction is substantially the same as that in the third embodiment of FIGS. 9A and 9B. When the authentication demand using the pair of ID information and organic information is performed from the user terminal 14 to the service providing system 10, the terminal address storing unit 48 stores the telephone number or network address of the user terminal 14 which requested the authentication. The telephone number or network address when the user terminal 14 requested the authentication are derived from a network communicating unit 52 provided for the service providing system 10. Specifically speaking, the telephone number or network address can be obtained as a reception parameter in a protocol layer of the network communicating unit 52.

Figure 13:
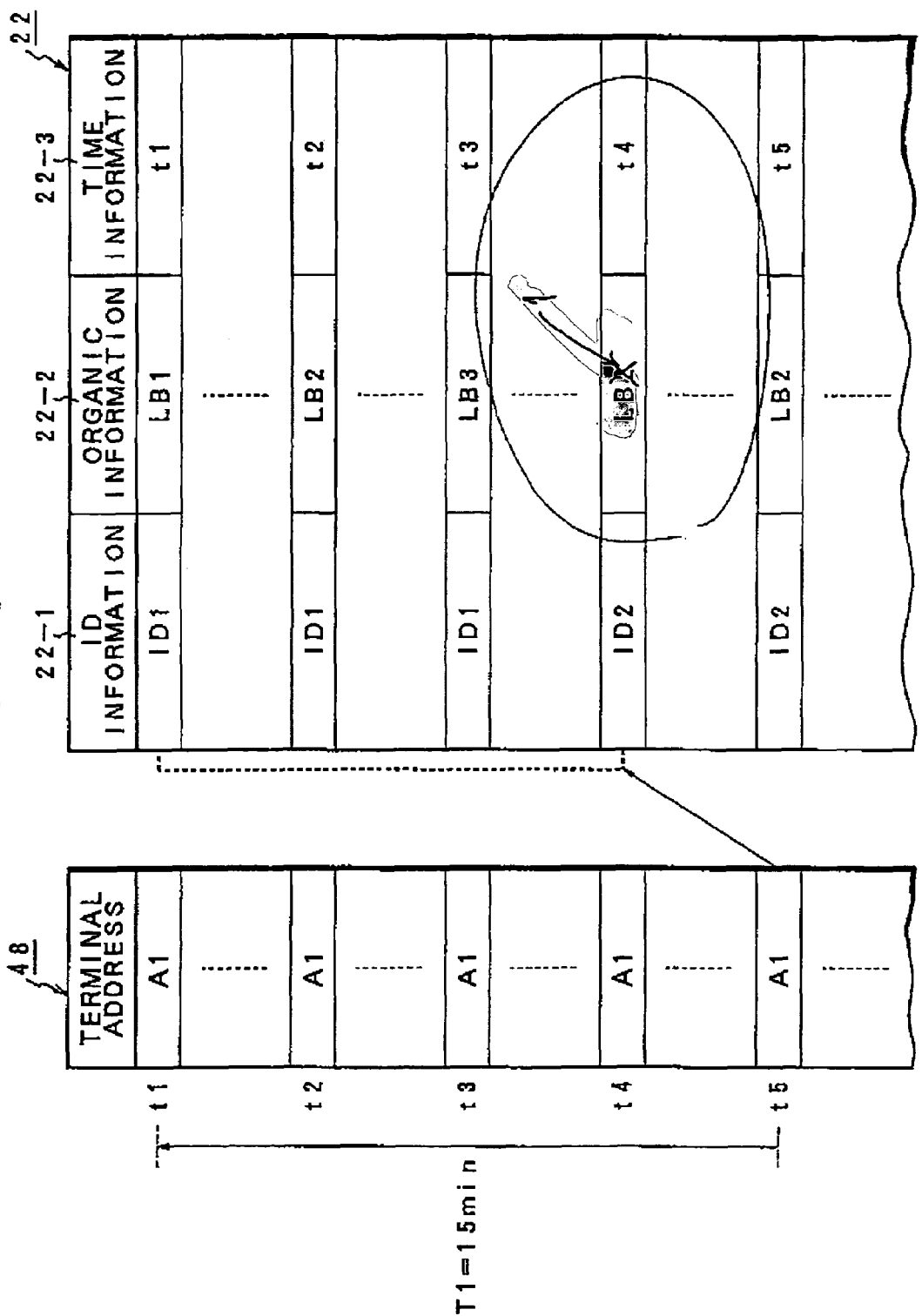
FIG. 13 is an explanatory diagram of a terminal address storing unit and a use information storing unit in FIGS. 12A and 12B.

FIG. 13 shows the storage contents in the terminal address storing unit 48 in FIGS. 12A and 12B together with the use information storing unit 22. An address of the user terminal used by the attacker in the case where he attacked while changing both the ID information and the organic information like an illegal access 25-3 in FIG. 5 is stored in the terminal address storing unit 48 with respect to times t1 to t5. A same terminal address A1 is stored. The storage pair corresponding to the input pair of ID information and organic information by the illegal access at times t1 to t5 of the illegal access in FIG. 5 has been stored in the use information storing unit 22 together with the time information t1 to t5.

Referring again to FIGS. 12A and 12B, the same terminal access detecting unit 50 detects whether a condition of "there is an authentication demand of a predetermined number of times or more from the same terminal position within a predetermined time" is satisfied or not with reference to the terminal address storing unit 48. When it is detected that such a condition is satisfied, a process to discriminate the illegal access is requested to the control unit 28. For example, when considering the terminal address storing unit 48 in FIG. 13, the same terminal access detecting unit 50 discriminates whether there is the authentication demand of a predetermined number N of times or more (for example, N=5 or more) from the same terminal address within a past predetermined time T1 (for example, T1=15 minutes) from the input time of a new authentication demand or not. In this case, since there is the authentication demand of five times from the same terminal address A1 within the past time (T1=15 minutes) at a point of input time t5, the same terminal access detecting unit 50 requests the control unit 28 to perform the discriminating process of the illegal access. Therefore, the control unit 28 activates the organic information collating unit 24 and ID information comparing unit 26 and compares and collates the input pair (ID2, LB2) at time t5 with the storage pairs stored so far. In this case, since the discriminating rule in FIG. 5 is satisfied between the input pair and the storage pairs at times t1, t2, t3, and t4 shown in the use information storing unit 22 and it is determined that there is the authentication demand by the illegal access person. Since the attack by the attacker is continuously performed in a short time, it is sufficient that the predetermined time T1 to discriminate the number N of times of authentication demand which is performed from the same terminal in the same terminal access detecting unit 50 is set to a time of up to about 30 minutes to one hour. The number N of accessing times from the same terminal is set to (N=5) as an example. However, it is sufficient that the number N of accessing times from the same terminal access to requests the process of the illegal access is determined on the basis of the number of permission retry times which are performed due to an erroneous input of the ID information by the legal user. For example, in case of FIG. 13, since the discrimination about the illegal access is requested when N=5, the retry due to the erroneous input of the ID information by the legal user is permitted up to four times.

Referring again to FIGS. 12A and 12B, when the authentication demand by the illegal access person is determined by the control unit 28, to inform the system administrator of a fact that the system was attacked by the attacker, the alarm signal generating unit 54 sends an alarm signal to the system administrator 44 via a network 42, thereby allowing an alarm to be generated. In this case, further, besides the organic information and ID information which were temporarily stored in the organic information input storing unit 18 and ID information input storing unit 20 when the authentication demand by the illegal access person is determined by the control unit 28, the log recording unit 32 records the telephone number or network address of the user terminal from the terminal address storing unit 48 and, further, records the time information from the timer unit 36.

Figure 14A:
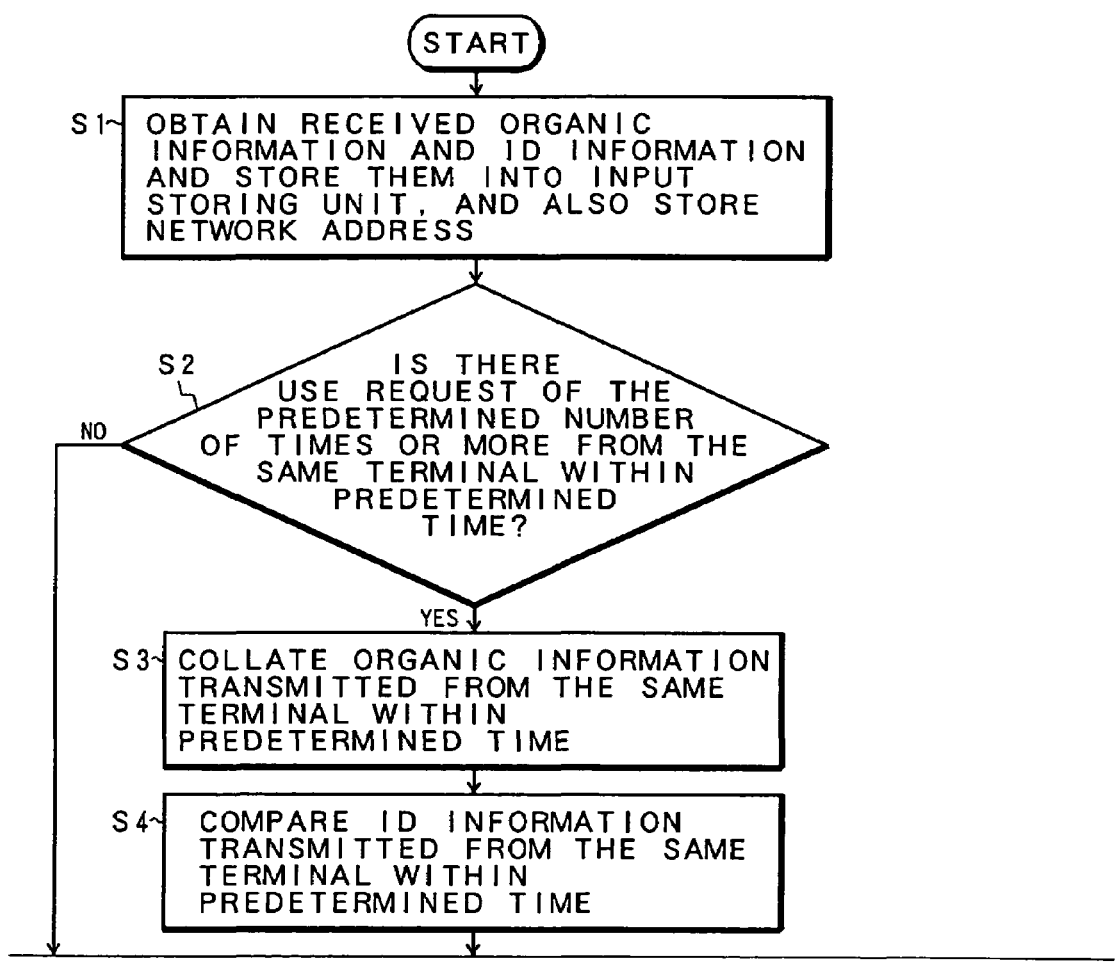
FIGS. 14A and 14B are flowcharts for an illegal access discriminating process in FIG. 13 which is activated when there is an authentication demand of a predetermined number of times from the same terminal within a predetermined time.
Figure 14B:
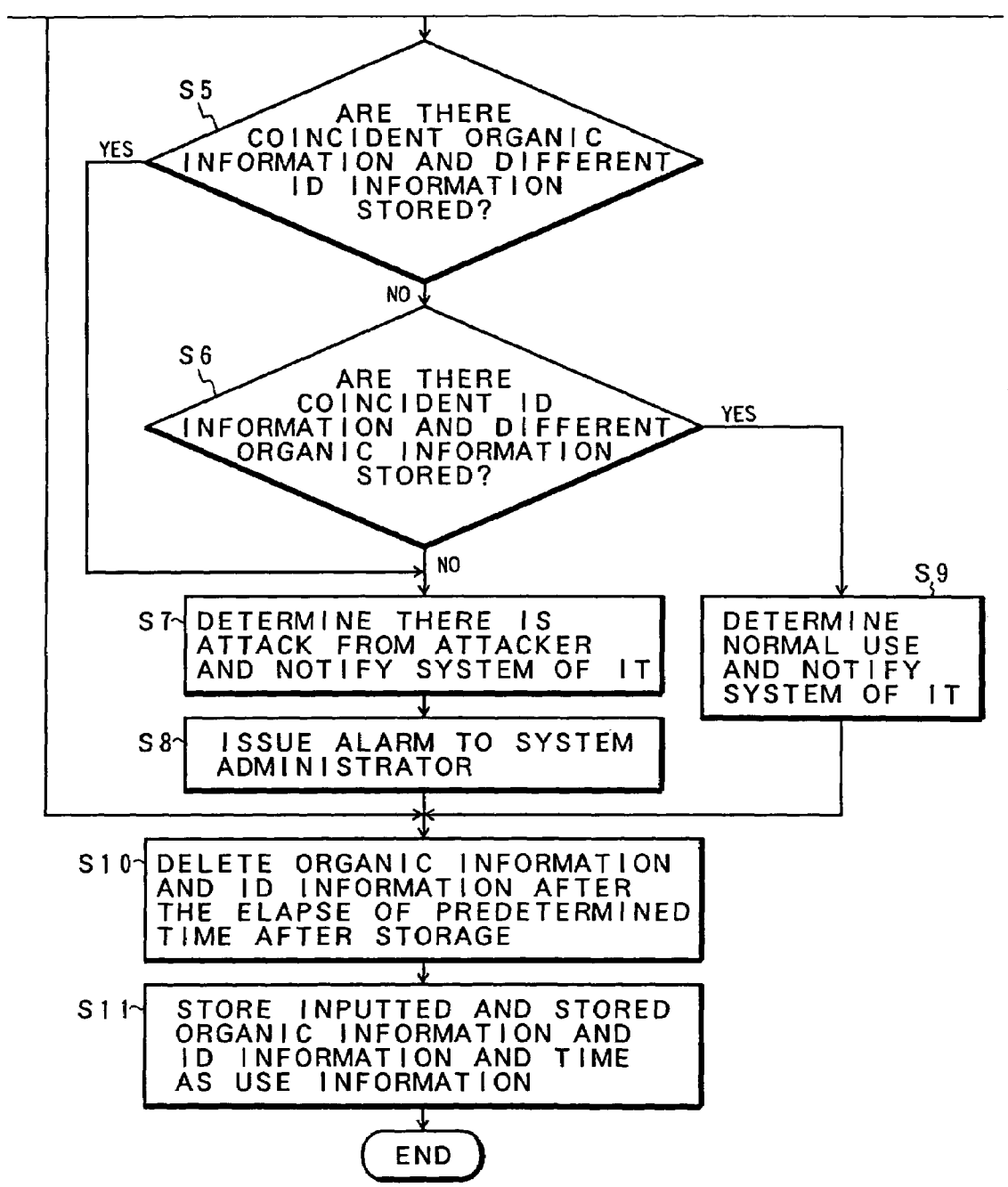

FIGS. 14A and 14B are flowcharts for an illegal access discriminating process according to the fourth embodiment of FIGS. 12A and 12B. In step S1, the organic information and ID information received by the service providing system 10 from the user terminal 14 are obtained and inputted and stored into the organic information input storing unit 18 and ID information input storing unit 20, respectively, and for example, the network address of the user terminal 14 derived from the network communicating unit 52 at that time is recorded into the terminal address storing unit 48. In subsequent step S2, the same terminal access detecting unit 50 discriminates whether there is a use request, namely, authentication demand of a predetermined number of times or more from the same terminal within a predetermined time or not with reference to the terminal address storing unit 48. When the condition in step S2 is satisfied, the illegal access discriminating process similar to that in the embodiment of FIG. 2 is performed as shown in steps S3 to S7 and S9. When the authentication demand by the illegal access person is decided and the attack by the attacker is notified to the service providing system in step S7, an alarm signal is issued from the alarm signal generating unit 54 to the system administrator 44, thereby notifying that there is the attack from the attacker to the service providing system 10. Subsequently in step S10, the stored contents after the elapse of a predetermined time were erased from the storage in the use information storing unit 22. In step S11, the pair of organic information and ID information which were inputted and stored at this time is stored together with the time information. A series of processes in association with the authentication demand in this instance is finished.

Figure 15:
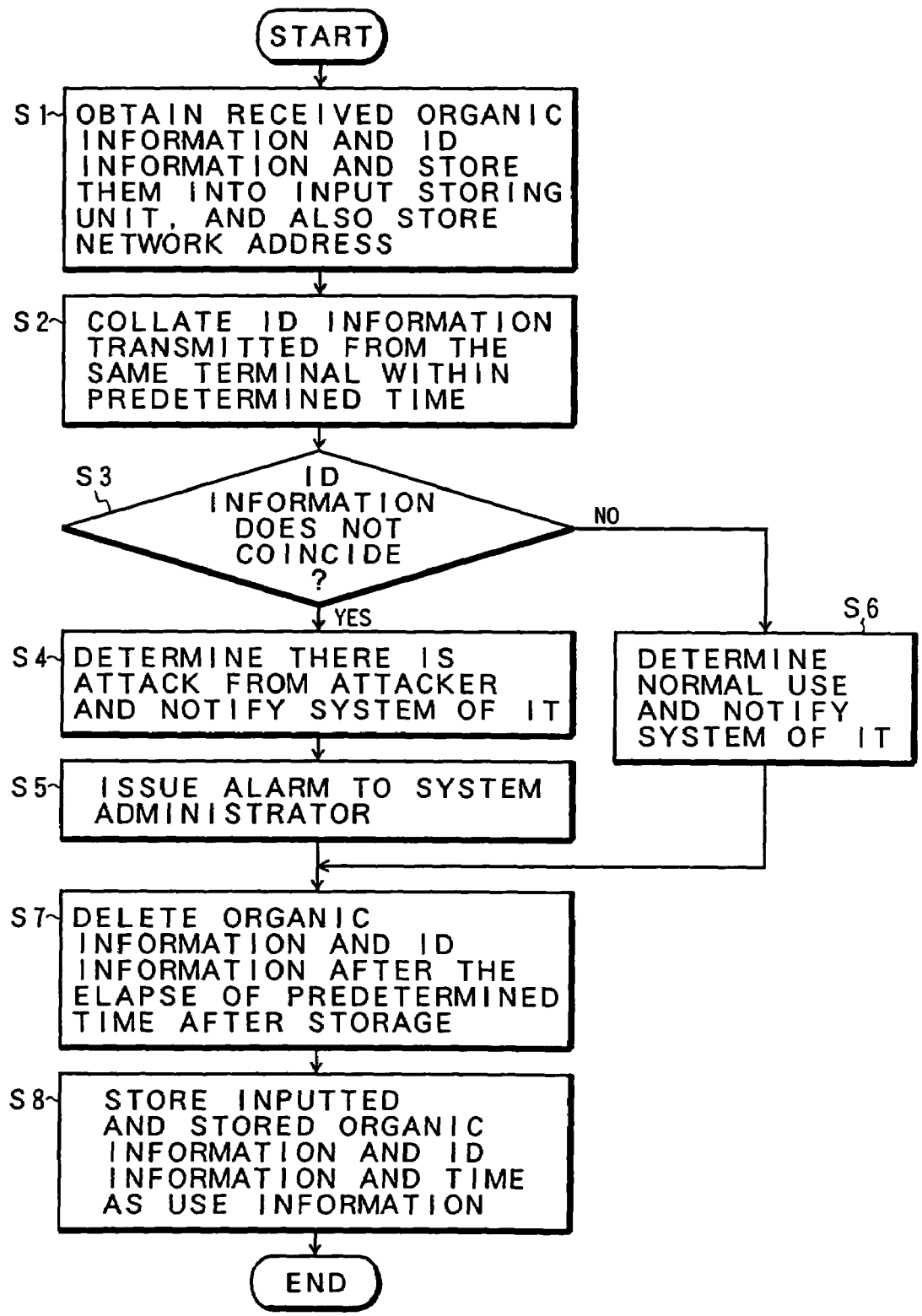
FIG. 15 is a flowchart for the illegal access discriminating process in FIG. 13 to which a discriminating rule 4 for discriminating an illegal access by only ID information inputted from the same terminal within a predetermined time is applied.

The discriminating rules 4, 5, and 6 to discriminate the illegal access in the control unit 28 of the illegal access discriminating system 16 of the invention will now be described. The discriminating process of the illegal access in FIG. 15 relates to the case of using the discriminating rule 4. According to the discriminating rule 4, when a result of comparison between the ID information which is newly inputted and the ID information inputted in the past within a predetermined time with respect to the same terminal indicates dissidence, it is determined that there is the authentication demand by the illegal access person. It is a feature of the discriminating rule 4 that the collation of the organic information is not performed. By discriminating the illegal access from the ID information without collating the organic information, the burden on the illegal access discriminating process can be remarkably reduced. Among the attacks by the attackers, as shown in the illegal access 25-1 in FIG. 3, there is a pattern such that the attacker continuously attacks while changing the ID information without changing the organic information from the specific user terminal. With respect to such an attack pattern like an illegal access 25-1 in FIG. 3, since the organic information is the same, it is not compared with the organic information inputted in the past but by detecting only a change in ID information, the attack by the attacker can be determined. The discriminating rule 4 which is applied to FIG. 15 is effective in the case where the telephone number, network address, or the like of the user terminal which performed the authentication demand has been stored in the terminal address storing unit 48.

The illegal access discriminating process to which the discriminating rule 4 is applied in FIG. 15 will now be described as follows. First in step S1, the organic information and ID information received by the service providing system 10 are obtained and stored into the organic information input storing unit 18 and ID information input storing unit 20 and, further, the terminal address, for example, network address is obtained from the network communicating unit 52 and stored into the terminal address storing unit 48.

Subsequently, the ID information sent from the same terminal within a predetermined time is collated in step S2. In this case, as shown in FIG. 13, in the terminal address storing unit 48, for example, the ID information in the use information storing unit 22 corresponding to the same terminal address A1 until a point of a predetermined time (T=15 minutes) in which the present time t5 is used as a reference is referred to. Since the attack in this instance presumes the pattern like an illegal access 25-1 in FIG. 3, the ID information which is obtained from the use information storing unit 22 within the predetermined time T1 from the same terminal address A1 is so different to be ID1, ID2, ID3, ID4, . . . . Therefore, whether the ID information does not coincide or not is discriminated in step S3. If it does not coincide, step S4 follows and it is determined that there is the attack from the attacker, and this fact is notified to the service providing system 10. The subsequent processes are substantially the same as those in steps S8 and S9 and subsequent steps in FIGS. 14A and 14B.

Figure 16:
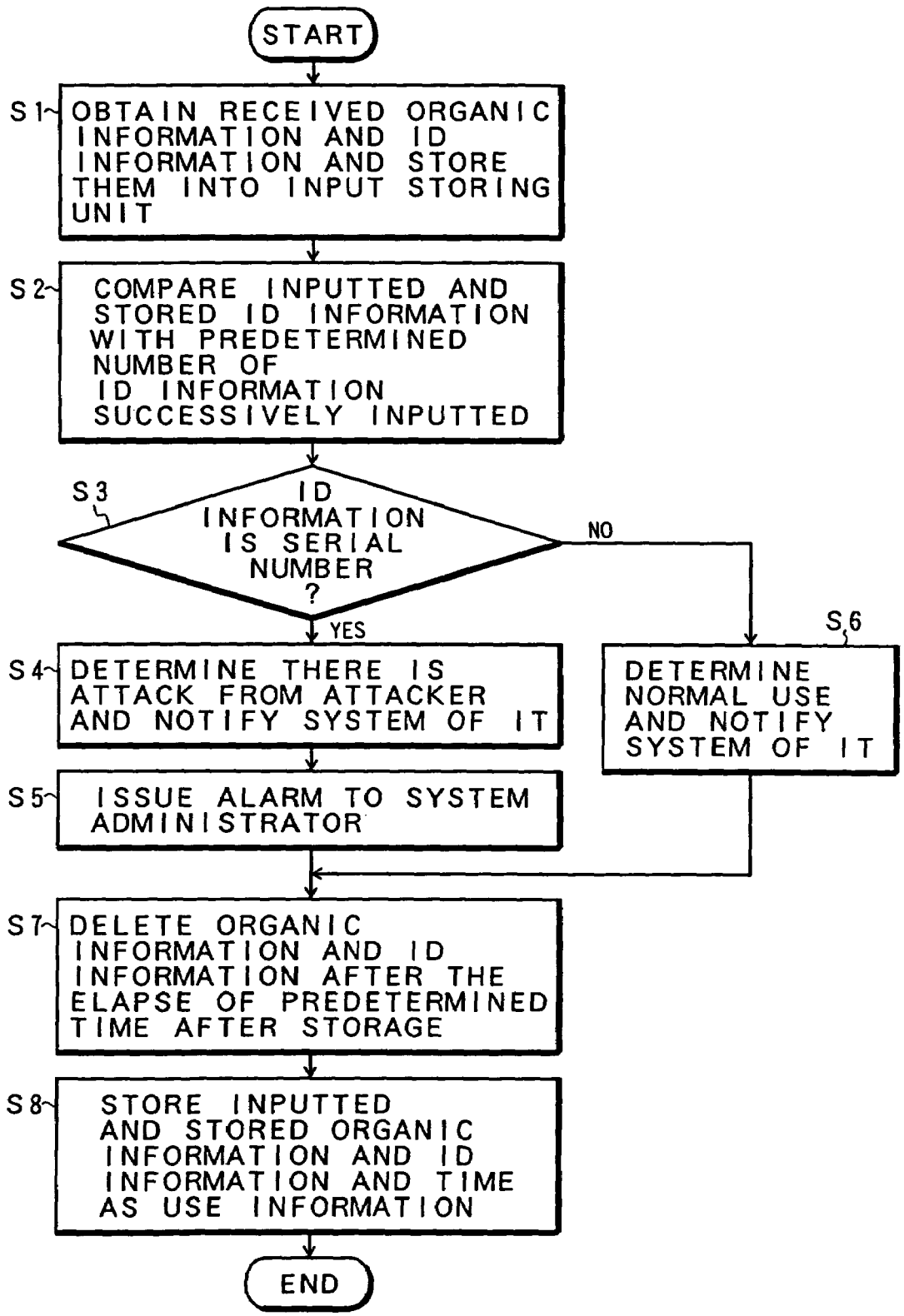
FIG. 16 is a flowchart for the illegal access discriminating process in FIG. 13 to which a discriminating rule 5 for discriminating an illegal access from a serial number input of ID information is applied.

FIG. 16 is a flowchart for an illegal access discriminating process in the case where the discriminating rule 5 is applied to, for example, the control unit 28 in the fourth embodiment of FIG. 13. According to the discriminating rule 5, whether the past ID information has a serial number for the inputted ID information or not is discriminated and, when it has the serial number, the authentication demand by the illegal access person is determined up to a predetermined number of times or more. When the new inputted and stored ID information is received, if the ID information has the serial number with reference to the ID information inputted in the past, a possibility such that there is the attack from the attacker is further high. This is because there is considered a case where the attacker attacks while sequentially changing the ID number by using the computer. Therefore, by examining whether the ID numbers inputted have the serial number or not by the discriminating rule 5, the user has a confidence indicative of the attack from the attacker, so that a probability about the illegal access is further improved.

The illegal access discriminating process to which the discriminating rule 5 is applied in FIG. 16 will now be described as follows. First in step S1, the organic information and ID information received by the service providing system 10 are obtained, inputted, and stored. In step S2, the inputted and stored ID information is compared with a predetermined number of ID information which was continuously inputted in the past and stored in the use information storing unit 22. Whether the ID information has the serial number or not is discriminated in step S3. If YES, it is determined that there is the attack due to the authentication demand from the attacker by the illegal access person in step S4 and it is notified to the service providing system 10. Processes in step S5 and subsequent steps are substantially the same as those in FIG. 15.

Figure 17:
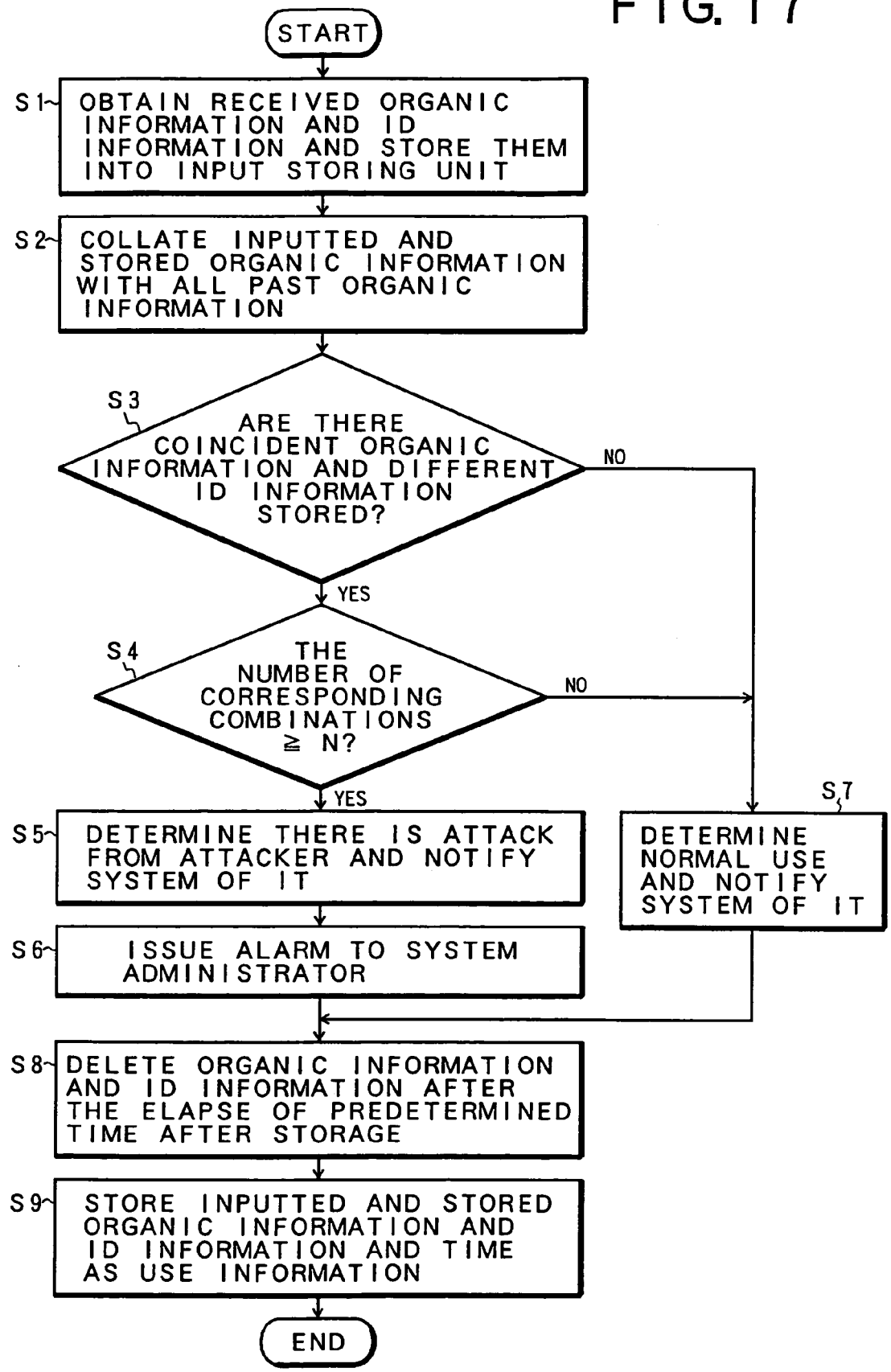
FIG. 17 is a flowchart for the illegal access discriminating process in FIG. 13 to which a discriminating rule 6 for distinguishing an erroneous input by a legal user and an input by an illegal access with respect to ID information is applied.

FIG. 17 is a flowchart using the discriminating rule 6 which is applied to the discrimination about the illegal access by the control unit 28 in the fourth embodiment of FIGS. 12A and 12B. According to the discriminating rule 6, when the inputted organic information and the organic information inputted in the past coincide, the other combinations in which the organic information coincides and the ID information differs are detected, and when the number of combinations reaches a predetermined value, it is determined that there is the authentication demand by the illegal access person. The discriminating rule 6 can be regarded as a modification of the discriminating rule shown in FIG. 3. That is, in the discriminating rule shown in FIG. 3, when any of the conditions such that the organic information coincides and the ID information does not coincide is satisfied, it is determined that there is the authentication demand by the illegal access person. On the other hand, according to the discriminating rule 6, when the number of conditions of the discriminating rule 1 reaches a predetermined number or more, it is determined that there is the authentication demand by the illegal access person. The discriminating rule 6 is provided to avoid a situation such that in the legal user merely erroneously input the ID information instead of a case where the attacker intends to illegally access, it is erroneously determined that there is the authentication demand by the illegal access person. Specifically speaking, it is assumed that the illegal access 25-1 in FIG. 3 is not performed by the attacker but occurs in the case where the legal user erroneously input the ID information and retries the input. In this case, now assuming that the number of times of different ID information at which it is determined to be the illegal access is set to, for example, N, the erroneous input of the ID information by the legal user is permitted up to (N+1) times. Now, assuming that the number of times of dissidence of the ID information at which it is determined to be the illegal access is set to, for example, N=3, the erroneous input by the legal user can be permitted up to (N+1=4) times. Therefore, if the user continuously erroneously input the ID information four times like an illegal access 25-1 in FIG. 3, the number of times of dissidence of the ID information is equal to 0 at time t1, 1 at time t2, 2 at time t3, and 3 at time t4 from the storage contents in the use information storing unit 22 corresponding to such a mistake. The erroneous input by the legal user is permitted until this time point. If the input of the ID information is mistaken once more, the number of times of dissidence based on the ID information stored in the use information storing unit 22 is equal to 4. At this time point, it is erroneously determined that there is the authentication demand by the illegal access person. The illegal access discriminating process to which the discriminating rule 6 is applied will now be described as follows with reference to a flowchart of FIG. 17. First in step S1, the organic information and ID information in association with the authentication demand of the user received by the service providing system 10 are obtained, inputted, and stored. In step S2, the inputted and stored organic information is collated with all of the past organic information. Whether there is any storage pair in which the organic information coincides and the ID information differs exists or not is discriminated in step S3. If there is the storage pair which satisfies this condition, step S4 follows and whether the number of relevant combinations is equal to or larger than N or not is discriminated. If it is less than N, it is determined that the re-input due to the mistake of the ID information by the legal user. In step S7, it is decided to be the normal use and this fact is notified to the system. If the number of combinations is equal to or larger than N, step S5 follows, it is decided that there is the attack from the attacker, and this fact is notified to the service providing system. Further, an alarm signal is generated to the system administrator in step S6. Processes in steps S8 and S9 are the same as those in steps S7 and S8 in FIG. 16.

According to the invention as mentioned above, the pair of ID number and organic information of the user for the authentication demand which are inputted to the service providing system is compared with the storage pairs of the ID information and organic information which were inputted in the past, thereby presuming and discriminating whether the attack of the illegal access from the attacker has been performed or not. If it is determined that there is a possibility of the attack from the attacker, a fact that there is the attack from the attacker is notified to the service providing system as an attack target, thereby allowing the system to take a proper defensive measure.

Since the organic information is peculiar to the individual, when the illegal access is decided, by logging the identity information of the attacker, a countermeasure against the attack from the next attacker can be performed and an effective clue in a criminal investigation can be given. The security of the system which provides services in response to the accesses from a number of users can be remarkably raised.

Although the above embodiments relate to the cases of individually applying the discriminating rules 1 to 6 to the discrimination of the illegal access in the control unit as examples, it is also possible to discriminate the illegal access by properly combining those discriminating rules.

Although the above embodiments have been described with respect to the case of using the fingerprint as organic information as an example, the illegal access can be also similarly discriminated with respect to organic information that is peculiar to each individual such as voiceprint, iris pattern, retina blood vessel pattern, palm shape, ear shape, face, and the like as organic information other than the fingerprint.

Further, the invention incorporates all of proper modifications and variations within the scope of the invention without departing from the objects and advantages of the invention. The invention is not limited by the numerical values shown in the above embodiments.

What is claimed is:

1. An illegal access discriminating apparatus that is placed in advanced of a user authentication system using biometrics which needs user information comprised of ID information and organic information comprising:
    a first storing unit for temporarily storing the latest pair of ID information and organic information inputted by a user when the user is being authenticated,
    a second storing unit for storing pairs of ID information and organic information which were inputted by arbitrary users within predetermined time, wherein said ID information and organic information is transferred from said first storing unit to said second storing unit after each authentication;
    a comparing and collating unit for comparing and collating the latest inputted ID information and organic information with all of ID information and organic information stored in said second storing unit which were inputted and not previously registered in the past; and
    a control unit for discriminating authentication demand by an attacker by counting the number of said comparing-collating results which satisfy predetermined conditions and judging authentication demand as the one by an attacker if said counted number exceeds predetermined value.

2. An apparatus according to claim 1, wherein said control unit determines that there is the authentication demand by the illegal access person in the case where the ID information does not coincide and the organic information coincides or the case where the ID information coincides and the organic information does not coincide on the basis of the output of said comparing and collating unit.

3. An apparatus according to claim 1, wherein said storing unit stores a telephone number serving as a transmitting source, a terminal position such as a network address, and an input time in correspondence to the ID information and organic information which were inputted in the past, and
    said control unit determines that there is the authentication demand by the illegal access person in the case where the comparison result by said comparing and collating unit between the inputted ID information and the past ID information inputted from a same terminal position within a predetermined time indicates dissidence.

4. An apparatus according to claim 1, wherein said control unit discriminates whether the past ID information has a serial number for the inputted ID information or not and, when it is determined that the past ID information has the serial number, said control unit determines that there is the authentication demand by the illegal access person at a predetermined designated number of times.

5. An apparatus according to claim 1, wherein when the inputted organic information and the organic information which was inputted in the past coincide, said control unit detects a combination in which the organic information coincides and the ID information differs, and when the number of said combinations reaches a predetermined number, said control unit determines that there is the authentication demand by the illegal access person.

6. An apparatus according to claim 1, wherein said comparing and collating unit comprises:
    an ID information comparing unit for comparing the inputted ID information and the ID information which was inputted in the past and generating a signal indicative of coincidence or dissidence; and
    an organic information collating unit for comparing the inputted organic information and the organic information which was inputted in the past, generating a signal indicative of coincidence of the organic information in the case where a value of a predetermined coincidence degree or more is obtained, and generating a signal indicative of dissidence of the organic information in the case where a value less than said predetermined coincidence degree is obtained.

7. An apparatus according to claim 1, further comprising a timer unit for measuring a time, and wherein the ID information and organic information which were inputted in the past after the elapse of a predetermined time from the storage on the basis of time information measured by said timer unit are erased and excluded from targets of the comparison and collation.

8. An apparatus according to claim 1, wherein
    said storing unit stores a telephone number serving as a transmitting source and a terminal position such as a network address or the like together with the ID information and organic information which were inputted in the past, and
    said comparing and collating unit compares and collates the inputted ID information and organic information with the ID information and organic information which were inputted in the past from a same terminal position.

9. An apparatus according to claim 1, further comprising:
    an authentication demand terminal address recording unit for recording the number of times of authentication demand every terminal address; and
    a same terminal access detecting unit for detecting that the authentication demand of a predetermined number or more has been performed within a predetermined time with reference to said authentication demand terminal address, activating said comparing and collating unit and said control unit, and allowing an illegal access to be discriminated.

10. An apparatus according to claim 1, wherein when it is determined that there is the authentication demand by the illegal access person, said control unit automatically notifies an administrator of a service providing system of a result of said discrimination.

11. An illegal access discriminating method that is placed in advanced of a user authentication system using biometric which needs user information comprised of ID information and organic information, comprising:
    a first storing step of temporarily storing the latest pair of ID information and organic information inputted by a user when the user is being authenticated;
    a second storing step of storing pairs of ID information and organic information which were inputted by arbitrary users within predetermined time, wherein said ID information and organic information is transferred from said first storing unit to said second storing unit after each authentication;
    a comparing and collating step of comparing and collating the latest inputted ID information and organic information with all of ID information and organic information stored in said second storing step which were inputted in the past; and a control step of discriminating authentication demand by an attacker by counting the number of said comparing-collating results which satisfy predetermined conditions and judging authentication demand as the one by an attacker if said counted number exceeds predetermined value.

12. A method according to claim 11, wherein in said control step, it is determined that there is the authentication demand by the illegal access person in the case where the ID information does not coincide and the organic information coincides or the case where the ID information coincides and the organic information does not coincide on the basis of the output in said comparing and collating step.

13. A method according to claim 11, wherein in said storing step, a telephone number serving as a transmitting source, a terminal position such as a network address, and an input time in correspondence to the ID information and organic information which were inputted in the past are stored, and in said control step, it is determined that there is the authentication demand by the illegal access person in the case where the comparison result in said comparing and collating step between the inputted ID information and the past ID information inputted from a same terminal position within a predetermined time indicates dissidence.

14. A method according to claim 11, wherein in said control step, whether the past ID information has a serial number for the inputted ID information or not is discriminated and, when it is determined that the past ID information has the serial number, it is determined that there is the authentication demand by the illegal access person at a predetermined designated number of times.

15. A method according to claim 11, wherein in said control step, when the inputted organic information and the organic information which was inputted in the past coincide, a combination in which the organic information coincides and the ID information differs is detected, and when the number of said combinations reaches a predetermined number, it is determined that there is the authentication demand by the illegal access person.

16. A method according to claim 11, wherein said comparing and collating step comprises:

an ID information comparing step of comparing the inputted ID information and the ID information which was inputted in the past and generating a signal indicative of coincidence or dissidence; and an organic information collating step of comparing the inputted organic information and the organic information which was inputted in the past, generating a signal indicative of coincidence of the organic information in the case where a value of a predetermined coincidence degree or more is obtained, and generating a signal indicative of dissidence of the organic information in the case where a value less than said predetermined coincidence degree is obtained.

17. A method according to claim 11, further comprising a timer step of measuring a time, and wherein the ID information and organic information which were inputted in the past after the elapse of a predetermined time from the storage on the basis of time information measured in said timer step are erased and excluded from targets of the comparison and collation.

18. A method according to claim 11, wherein in said storing step, a telephone number serving as a transmitting source and a terminal position such as a network address or the like are stored together with the ID information and organic information which were inputted in the past, and in said comparing and collating step, the inputted ID information and organic information with the ID information and organic information which were inputted in the past from a same terminal position are compared and collated.

19. A method according to claim 11, further comprising:

an authentication demand terminal address recording step of recording the number of times of authentication demand every terminal address; and a same terminal access detecting step of detecting that the authentication demand of a predetermined number or more has been performed within a predetermined time with reference to said authentication demand terminal address, activating said comparing and collating step and said control step, and allowing an illegal access to be discriminated.

20. A method according to claim 11, wherein in said control step, when it is determined that there is the authentication demand by the illegal access person, a result of said discrimination is automatically notified to an administrator of a service providing system.

* * * * *